(12) United States Patent
Wamble, III

(10) Patent No.: US 10,899,236 B2
(45) Date of Patent: *Jan. 26, 2021

(54) DRIVE SYSTEM FOR A TRANSPORTATION SYSTEM

(71) Applicant: SkyTran, Inc., Moffett Field, CA (US)

(72) Inventor: John Lee Wamble, III, Kenmore, WA (US)

(73) Assignee: SKYTRAN INC., Irvine, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/102,723

(22) Filed: Aug. 13, 2018

(65) Prior Publication Data

US 2019/0084443 A1    Mar. 21, 2019

Related U.S. Application Data

(63) Continuation of application No. 14/808,884, filed on Jul. 24, 2015, now Pat. No. 10,046,668, which is a
(Continued)

(51) Int. Cl.
*B60L 13/10* (2006.01)
*B60L 13/04* (2006.01)

(52) U.S. Cl.
CPC .............. *B60L 13/10* (2013.01); *B60L 13/04* (2013.01); *B60L 2200/26* (2013.01)

(58) Field of Classification Search
CPC ....... B61L 13/04; B61L 13/042; B61L 13/047
See application file for complete search history.

(56) References Cited

U.S. PATENT DOCUMENTS 3,407,749 A    10/1968 Frig
3,611,944 A    10/1971 Reder
(Continued)

FOREIGN PATENT DOCUMENTS

CN    2068732 U    1/1991
CN    1055265 A    10/1991
(Continued)

OTHER PUBLICATIONS

Japanese Office Action for Application 2014-238830; dated Jun. 21, 2016.
(Continued)

*Primary Examiner* — Robert J McCarry, Jr.
(74) *Attorney, Agent, or Firm* — Polsinelli PC

(57) ABSTRACT

A transport system including at least one guideway, at least one levitation generator, at least one lifting member, at least one drive generator, and at least one drive member is presented. The at least one guideway, at least one levitation generator, at least one lifting member, at least one drive generator, and at least one drive member can each be implemented with other systems. The at least one drive generator is configured to: generate a driving magnetic flux; move with a corresponding at least one drive member; and be driven relative to the at least one drive member by the driving magnetic flux. The at least one levitation generator can be configured to: generate a levitating magnetic flux; move within a corresponding at least one lifting member; and elevate above a rest position relative to the at least one lifting member in response to the levitating magnetic flux.

19 Claims, 15 Drawing Sheets

Related U.S. Application Data continuation of application No. 14/130,310, filed as application No. PCT/US2012/044273 on Jun. 26, 2012, now Pat. No. 9,090,167.

(60) Provisional application No. 61/571,561, filed on Jun. 30, 2011.

(56) References Cited

U.S. PATENT DOCUMENTS

| | | | |
|---|---|---|---|
| 3,837,287 | A | 9/1974 | Lichtenberg |
| 5,317,976 | A | 6/1994 | Aruga et al. |
| 5,717,261 | A | 2/1998 | Tozoni |
| 9,090,167 | B2 * | 7/2015 | Wamble, III ........... B60L 13/04 |
| 10,046,668 | B2 * | 8/2018 | Wamble, III ........... B60L 13/04 |
| 2003/0112105 | A1 | 6/2003 | Post |
| 2008/0148991 | A1 | 6/2008 | Wamble |

FOREIGN PATENT DOCUMENTS

| | | |
|---|---|---|
| CN | 201030803 Y | 3/2008 |
| CN | 101771327 A | 7/2010 |
| CN | 101780775 A | 7/2010 |
| DE | 102007008592 A1 | 8/2008 |
| EP | 0299137 A2 | 1/1989 |
| EP | 0894660 A1 | 2/1999 |
| GB | 980821 A | 1/1965 |
| JP | H02262803 A | 10/1990 |
| JP | H06316263 A | 11/1994 |
| JP | 10257751 A | 9/1998 |
| JP | 2009177888 A | 8/2009 |
| WO | WO 2013/003387 A2 | 1/2013 |

OTHER PUBLICATIONS

English Machine Translation of JP H02262803.
Chinese Office Action for Application 201280041867.0; dated Aug. 8, 2015.
English Translation of Chinese Office Action for application No. 201280041867.0; dated Aug. 8, 2015.
English Abstract of CN101780775; Published Jul. 21, 2010; Retrieved from www.espacenet.com on Oct. 26, 2015.
English Abstract of CN101771327; Published Jul. 7, 2010; Retrieved from www.espacenet.com on Oct. 26, 2015.
English Abstract of JPH10257751; Published Sep. 25, 1998; Retrieved from www.espacenet.com on Oct. 26, 2015.
English Abstract of CN2068732; Published Jan. 2, 1991; Retrieved from www.espacenet.com on Oct. 26, 2015.
English Abstract of CN1055265; Published Oct. 9, 1991; Retrieved from www.espacenet.com on Oct. 26, 2015.
English Abstract of CN201030803; Published Mar. 5, 2008; Retrieved from www.espacenet.com on Oct. 26, 2015.
English Abstract of EP0299137; Published Jan. 18, 1989; Retrieved from www.espacenet.com on Oct. 26, 2015.
English Abstract of EP Publication No. EP0299137A1 published Jan. 18, 1989; downloaded Dec. 30, 2013.
English Abstract of JP Publication No. JP2009177888 published Aug. 6, 2009; downloaded Dec. 30, 2013.
English Abstract of JP Publication No. JPH06316263A published Nov. 15, 1994; downloaded Dec. 30, 2013.
International Search Report for International Application No. PCT/US2012/044273 dated Oct. 30, 2013.

* cited by examiner

DRIVE SYSTEM FOR A TRANSPORTATION SYSTEM

CROSS REFERENCE TO RELATED APPLICATION

This application is a continuation of U.S. patent application Ser. No. 14/808,884 filed on Jul. 24, 2015, which is a continuation of U.S. patent application Ser. No. 14/130,310 filed on Dec. 30, 2013, now U.S. Pat. No. 9,090,167, which is a National Stage Entry of International Patent Application No. PCT/US2012/044273 filed Jun. 26, 2012, which claims the benefit of U.S. Provisional Application 61/571,561, filed Jun. 30, 2011, said applications are expressly incorporated herein in their entirety.

FIELD

The subject matter herein is directed to drive and levitation systems for transportation systems.

BACKGROUND

Magnetic levitation systems have been designed in general as systems that levitate through the use of attraction or repulsion between two objects. These magnetic levitation systems are dependent upon the spacing of the two objects such that if the spacing of the two objects changes, the forces produced by the magnets on each of the objects change. Furthermore, in systems that implement magnetic levitation via a track, for example on trains, requires that the track be very level. Thus, if the ground shifts over time because of weather or weight of the train and track, the track will have to be repaired.

BRIEF DESCRIPTION OF THE DRAWINGS

Implementations of the present technology will now be described, by way of example only, with reference to the attached figures, wherein.

DETAILED DESCRIPTION

Figure 1:
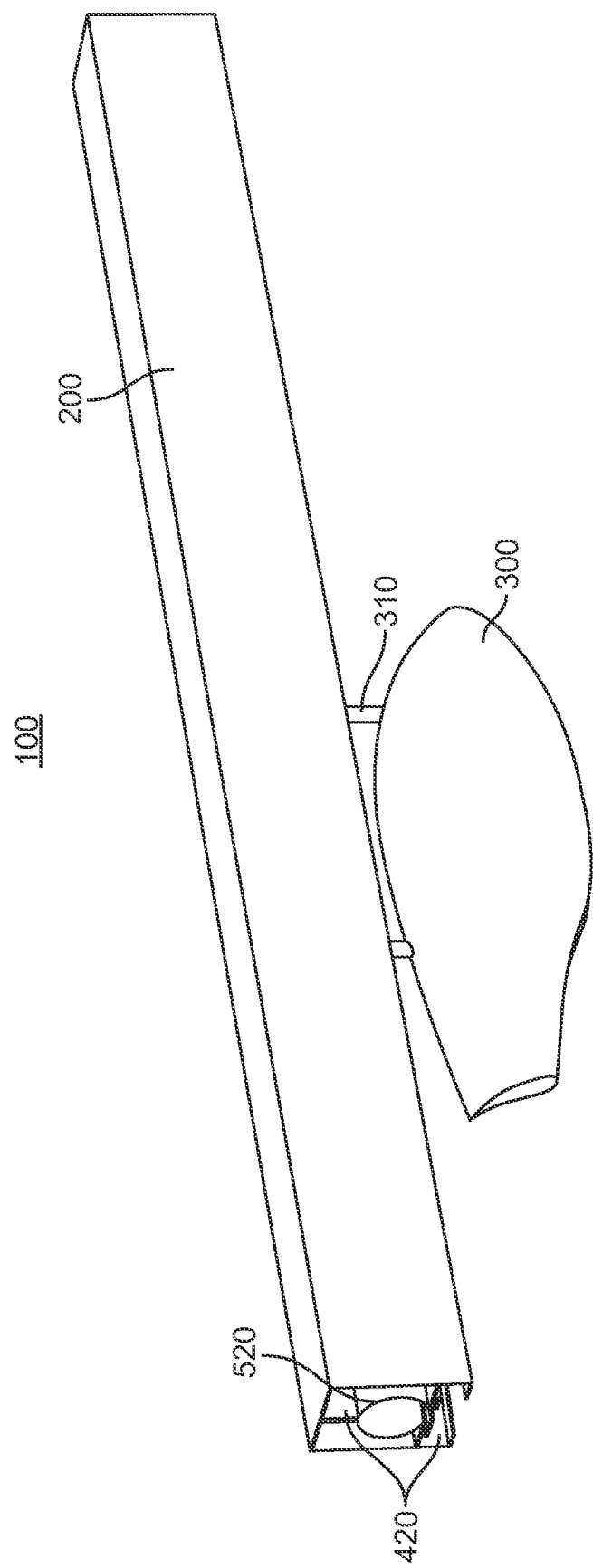
FIG. 1 is a perspective view of an exemplary embodiment of a transport system according to the present disclosure.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term "levitation" as used herein refers to the lifting and suspension of an object relative to another object in the absence of mechanical contact between the objects. Another term is "levitation force." Levitation force is the force that provides for levitation. In this first sense, levitation force acts in a vertical direction (the direction opposite the direction of gravity), but those skilled in the art will readily recognize that the same force may be used to move or position two objects in a lateral direction or in some direction with both vertical and lateral components. To generalize, the terms "levitation" and "levitation force" as used herein refer respectively to contactless positioning and force between two objects in a direction substantially orthogonal to the primary direction of travel. A "levitation generator" is a device that is configured to generate magnetic waves that interact with a lifting member to levitate the movable object with respect to the stationary object.

"Drive force" refers to the force required to accelerate, maintain motion or decelerate one object with respect to another. As used herein "drive force" means a force substantially in line with the primary direction of travel, effected without mechanical contact between the two objects. A "drive generator" is a device that is configured to generate magnetic waves that interact with a drive member to drive the movable object with respect to the stationary object.

Another term used herein is a "guideway." A guideway is a device or structure that provides for a path along which a car, vehicle, or bogie can move along. A car refers to a device which is configured for travel along the guideway. The car can be at least partially enclosed, entirely enclosed or have only one surface upon which objects or persons can be placed. The car can be coupled to a bogie which is in turn coupled to the guideway. The bogie can be an integral component of the car or a separate component to which the car can be coupled. A bogie as used herein does not necessarily include wheels, but instead is configured for engagement with the guideway.

Another term used herein is "coupled." Coupled can refer to the linking or connection of two objects. The coupling can be direct or indirect. An indirect coupling includes connecting two objects through one or more intermediary objects. Coupling can also refer to electrical or mechanical connections. Coupling can also include magnetic linking without physical contact.

Another term used herein is a "magnetic source." A magnetic source is any material that naturally produces a magnetic field or can be induced to generate a magnetic field. For example, a magnetic source can include a permanent magnet, an electromagnet, a superconductor, or the like.

The present disclosure presents a transport system that includes one or more components as presented herein. The transport system can include a guideway for providing a path for a car to move along. The transport system can also include one or more drive generators that are configured to provide a drive force. The transport system can also include one or more levitation generators that are configured to provide a levitation force. While the description presents a system of these components, each of these components can be implemented with other systems or integrated into systems where only one of the components is desired. For example, the levitation generator as presented herein can be integrated into other systems. For example, the levitation generator can be implemented as part of a magnetic levitation train, a moving walkway, or another system that includes one or more moving components. Similarly, the drive generator can be used in conjunction with other systems. For example, the drive generator can be implemented with traditional magnetic levitation systems. Likewise, the guideway can be modified to cooperate with just a drive generator or just a levitation generator. Therefore, the components as described herein can be implemented singly or in a system with one or more of the components presented herein. Additionally, a transport apparatus is presented herein which includes at least one levitation generator, at least one drive generator, at least one lifting member, and at least one drive member.

While, in the embodiments presented herein, the lifting member does not generate a static magnetic flux, other embodiments can include a lifting member that is configured to generate a static magnetic flux. The magnetic flux can be generated by permanent magnets or electromagnets.

As presented herein, the present disclosure concerns a transport apparatus, a bogie, a levitation generator, a drive generator, a guideway, a transport system or some combination thereof.

As described herein, the levitation generator can be configured to lift a coupled vehicle in relation to a lifting member. The levitation generator can include: a shaped member configured to be magnetically coupled with the lifting member. The shaped member can have at least one elongate magnetic pole configured to generate a lifting flux field for intersecting at least a portion of the lifting member. The lifting flux can be dependent upon the motion of the at least one magnetic pole surface in a direction of travel and the angle of the at least one magnetic pole surface relative to the direction of travel. The at least one magnetic pole surface can include a plurality of magnetic sources. The produced lifting flux field can be independent of the relative position of the at least one levitation generator relative to the corresponding at least one lifting member. The at least one elongate magnetic pole can be oriented at an angle relative to the direction of relative motion of the at least one levitation generator to the at least one lifting member, such that a lifting force component is generated in a direction normal to the direction of relative motion. The angle can be a predetermined angle based on a magnetic force versus normal velocity constant $K_{FN}$, the relative velocity between the at least one levitation generator and the at least one lifting element, and the lifting force required. The angle can be a variable angle based on magnetic force versus normal velocity constant $K_{FN}$, the relative velocity between the at least one levitation generator and the at least one lifting element, and the lifting force required. The lifting force can be dependent upon a length of the at least one elongate magnetic pole relative to a width and a height of the elongate magnetic pole, such that the lifting force increases as the length is greater as compared to the width and height. The lifting force can be dependent upon the velocity of the elongate magnetic pole relative to the at least one lifting member, wherein a higher velocity produces greater lift. The at least one elongate magnetic pole can include a plurality of magnetic elements arranged in a row. The at least one elongate magnetic pole can include two elongate magnetic poles and each of the two elongate magnetic poles can include a plurality of magnetic elements arranged in a row.

Additionally, a drive generator is presented herein. The drive generator is configured for driving a coupled bogie and/or vehicle/car. The drive generator can include: at least one substantially cylindrical member; a plurality of magnets located on the surface of the at least one substantially cylindrical member, wherein the plurality of magnets are arranged so as to form a helix; and a rotational motor for rotating the at least one substantially cylindrical member such that the rotation of the at least one substantially cylindrical member produces a helically varying magnetic flux in the corresponding drive member so as to cause the drive generator to move in relation to the corresponding drive member. The drive generator can include at least one resting drive wheel configured to contact the corresponding drive member when the speed of the drive generator is below a predetermined speed. Furthermore, the drive generator can include at least one resting drive wheel and in one example the at least one resting drive wheel can be three resting drive wheels. The at least one resting drive wheel can be configured to be controlled by a deployment driver so that the at least one resting drive wheel is flush with the cylindrical member in a driven state and extends beyond the cylindrical member in a low speed driven or non-driven state. The at least one substantially cylindrical member can be two substantially cylindrical members. The two substantially cylindrical members can be rotated by the same rotational motor but rotate in opposite directions. In at least one embodiment, an additional rotational motor such that the rotational motor drives one of the two substantially cylindrical members and the additional rotation motor can drive the other one of the two substantially cylindrical members. The plurality of magnets can be arranged in a plurality of rows. The plurality of rows can be three rows. In yet another embodiment, the plurality of magnets can be arranged in a row such that two different poles are arranged on the outside of each portion of the respective row. The two different poles can be spaced apart by a predetermined distance. The two different poles can be coupled to a backing member. The plurality of magnets can be arranged in at least one row and said plurality of magnets are mounted to a backing member, such that the backing member and plurality of magnets can be removed from the cylindrical member. The drive member can include an electrical armature with substantially helically wound polyphase electrical conductors. The electrical armature can be supplied with electrical currents to cause rotational force on a corresponding one of the at least one drive generator. The electrical armature can be supplied with electrical currents to cause linear force a corresponding one of the at least one drive generator. The rotation of a corresponding one of the at least one drive generator causes electrical currents to flow within the armature. The linear motion of a corresponding one of the at least one drive generator can cause electrical currents to flow within the armature. Relative linear motion between the at least one substantially cylindrical member and corresponding drive member can cause the at least one substantially cylindrical member to rotate, and the at least one substantially cylindrical member can be coupled to an electrical generator, which can cause the electrical generator to rotate and produce electrical power. The electrical generator can be a generator-motor such that the generator and motor are the same component.

Additionally, a guideway is presented. The guideway can include: at least one lifting member; at least one drive member can be coupled to the at least one lifting member by a guideway coupling member; the at least one lifting member can be configured to receive a levitating magnetic flux generated by a corresponding at least one levitation generator; and the at least one drive member can be configured to receive a driving magnetic flux generated by a corresponding at least one drive generator. The at least one lifting member can include two lifting members. The at least two lifting members can be two tracks, each track having three sides. Each track can include a plurality of segments. The cross-section of each of the two tracks can be substantially rectangular. The at least one drive member can be substantially cylindrical in shape.

Additionally, a bogie is disclosed configured for cooperation with a mating guideway including at least one drive member and at least one lifting member. The bogie can include: a support portion; at least one drive generator can be coupled to the support portion, wherein the at least one drive generator is configured to generate a driving magnetic flux; at least one levitation generator can be coupled to the support portion, such that the at least one levitation generator can be configured to generate a levitating magnetic flux; the at least one levitation generator can be configured to move within a corresponding at least one lifting member; the at least one drive generator can be configured to move within a corresponding at least one drive member; the at least one levitation generator can be configured to be elevated above a rest position relative to the at least one lifting member in response to the influence of the levitating magnetic flux from the levitation generator; the at least one drive generator can be configured to be driven relative to the at least one drive member by the driving magnetic flux from the at least one drive generator.

FIG. 1 illustrates a transport system 100 as presented herein. The transport system 100 includes a guideway 200 and a car 300. The car 300 can be configured to hold one or more people. In other embodiments, the car 300 can be configured to hold livestock, animals, or objects. The car 300 can be configured to hold between 1-6 people. The car 300 can be coupled to a bogie (not shown) via car coupling rods 310. The transport system 100 as described herein can include one or more drive members and one or more levitation generator. In other embodiments, only a drive generator can be included with a different levitation generator. In yet another embodiment, the one or more levitation generator can be implemented without the drive generator as described herein.

The guideway 200 includes at least one drive member 520 and at least one levitation member 420. As illustrated in FIG. 1, only a single drive member 520 is present. The drive member 520 as illustrated is substantially a cylindrical shape. The drive member 520 can have one or more slots formed therein. The one or more slots formed in the drive member 520 allow for lifting members to protrude therefrom. Additionally, the one or more slots can be configured to allow the drive generator that is configured to pass through the drive member 520 to be coupled to the car 300. The guideway 200, at least one drive member 520, and at least one levitation member 420 can be configured as segments. While the illustrated embodiment does not include segments, the segments can be made such that guideway 200 is assembled in segments including the components of the at least one drive member 520 and at least one levitation member 420 already mounted therein. The segments of the guideway 200 and the at least one drive member 520 and at least one levitation member 420 can be of different lengths. The guideway 200 can further be mounted within another structure. For example, the guideway 200 can be mounted within a shell that is designed to protect the guideway 200 from weather, chemicals, intrusion, and other environmental factors.

Figure 2:
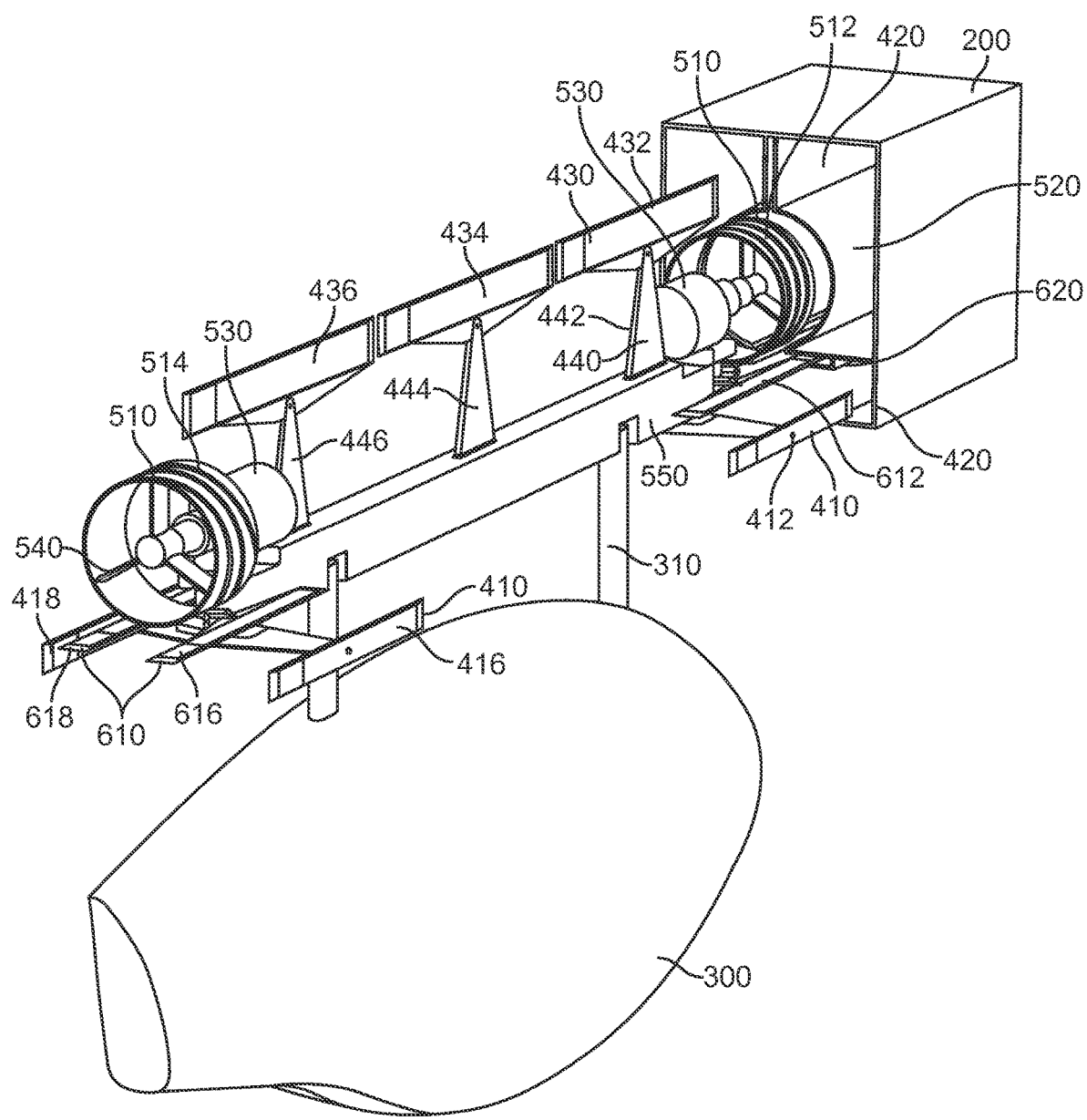
FIG. 2 is perspective view of an exemplary embodiment of a transport system according to the present system in which the levitation system and drive system are exposed for illustrative purposes.

FIG. 2 illustrates a perspective view of an exemplary transport system 100. The transport system 100 is substantially the same as FIG. 1, but the at least one drive generator 510 and the at least one levitation generator 410 are shown external to the guideway 200 for illustrative purposes. As shown, there are two drive generators 510 and there are seven levitation generators 410, 430. The two drive generators 510 include a front drive generator 512 and a rear drive generator 514. The two drive generators 510 are coupled to respective drive motors 530 that are configured to rotate the drive generator 510 to provide a driving magnetic flux. The respective drive motors 530 can be controlled via a controller that includes one or more processors and one or more memory devices. The controller can be configured to rotate only one of the drive generators 510 and not the other drive generator 510. For example the front drive generator 512 can be made to rotate about its axis, but the rear drive generator 514 can be held steady. In at least one embodiment, the front drive generator 512 and the rear drive generator 514 can be made to rotate in opposite directions, but the front drive generator 512 and rear drive generator 514 can supply motive force in the same direction. The drive generators 510 can be coupled to the drive motor 530 via drive generator coupling devices 540. The drive generator coupling device 540 can be configured to have a reduced drag profile as they rotate. In yet other embodiments, one of which is illustrated herein, other components can be located within the drive generator 510. The drive motors 530 can be coupled to bogie 550.

The drive generators 510 can be configured to move within the drive member 520. As shown, there are two drive generators 510 that move within a single drive member 520. In other embodiments, when more than one drive generator 510 is implemented, each individual drive generator 510 can move with a respective drive member 520. The front drive generator 512 is coupled to the rear drive generator 514 by a bogie 550.

The bogie 550 as illustrated can also be coupled to the car 300 via car coupling rods 310. As illustrated there are two car coupling rods 310, in other embodiments a single car couple rod 310 can be implemented. In yet other embodiments, more than two car coupling rods 310 can be implemented.

The bogie 550 can be further coupled to the at least one levitation generator 410, 430. As shown, there are outboard levitation generators 410 and inboard levitation generators 430. The outboard levitation generators 410 and in board levitation generators 430 can be configured to operate in a similar way. The inboard levitation generators 430 can be located closer to the centerline of the bogie 550 as compared with the outboard levitation generators 410.

The levitation generators 410, 430 can be configured to generate a levitating magnetic flux. The levitating magnetic flux will be explained in greater detail hereinbelow. The levitating magnetic flux can be generated from one or more magnetic sources within the levitation generators 410, 430. The levitation generators 410, 430 cooperate with at least one lifting member 420 to lift the levitation generators 410, 430 from a rest position to a levitated position. The levitated position is in the direction of the levitation force generated by the at least one levitation generator 410, 430. The magnetic sources 410, 430 can be configured to generate a lifting force in response to motion relative to the respective one or more lifting members 420. In one embodiment such as the one illustrated, there can be four outboard levitation generators 410, namely a right front outboard levitation generator 412, a left front outboard levitation generator (not shown), a right rear outboard levitation generator 416, and a left rear outboard levitation generator 418. Furthermore, in the illustrated embodiment, the bogie 550 can coupled to three inboard levitation generators 430, namely a front inboard levitation generator 432, a middle inboard levitation generator 434, and a rear inboard levitation generator 436. The inboard levitation generators 430 can be coupled to the bogie 550 via inboard couplers 440. The front inboard levitation generator 432 can be coupled to the bogie 550 via a front inboard coupler 442. The middle inboard levitation generator 434 can be coupled to the bogie 550 via a middle inboard coupler 444. The rear inboard levitation generator 436 can be coupled to the bogie 550 via a rear inboard coupler 446.

When a plurality of levitation generators 410, 430 are implemented such as illustrated, the levitation generators 410, 430 can be configured to be controlled by a controller (not illustrated). The controller can adjust the lift forces that result from the levitating magnetic flux generated by the levitation generators 410, 430. In other embodiments, the levitating magnetic flux generated by the levitation generators 410, 430 can be a predetermined levitating magnetic flux. In at least one embodiment, as will be explained in greater detail below, the levitation generators 410, 430 can include one or more magnetic sources each producing two elongate magnetic poles. The one or more magnetic sources can include a plurality of magnets.

While a plurality of levitation generators 410, 430 are illustrated, the present disclosure contemplates the implementation with a single levitation generator 410, 430. The single levitation generator 410, 430 can either be positioned as an inboard levitation generator 430 or outboard levitation generator 410.

As indicated above, the levitation generators can be configured to provide a levitation force that is in directions other than against gravity. In one example, one or more levitation generators 410, 430 can be implemented as one or more steering generators 610. In the illustrated example, four steering generators 610 are included, namely a front right steering generator 612, a front left steering generator (not shown), a rear right steering generator 616, and a rear left steering generator 618. The steering generators 610 operate similarly to the levitation generators 410, 430 except the direction of the magnetic flux is substantially at/oriented at a right angle to the flux generated by the levitation generators 410, 430. The steering generators 610 are configured to generate a steering magnetic flux which pierces the steering member 620. The steering member 620 cooperates with the steering generator 610 in a similar way as the levitation generators 410 interact with lifting members 420, but rotated at ninety-degrees. When both levitation generators 410, 430 and steering generators 610 are used, the position of the bogie 550 and car 300 can be controlled using the steering generators 610. This results in improved handling and tracking characteristics as the guideway 200 shifts over time or as the guideway 200 has curves that the bogie 550 must navigate through.

While the illustrated embodiment, implemented seven levitation generators 410, 430, two drive generators 510, and four steering generators 610, other embodiments can implement only one levitation generator 410, 430, a drive generator 510, or steering generator 610. In yet other embodiments, a combination of one or more levitation generators 410, 430, drive generators 510, and/or steering generators 610 can be implemented. Additionally, other embodiments can implement one or more levitation generators 410, 430, drive generators 510, and/or steering generators 610 according to the remainder of the disclosure presented herein.

Figure 3:
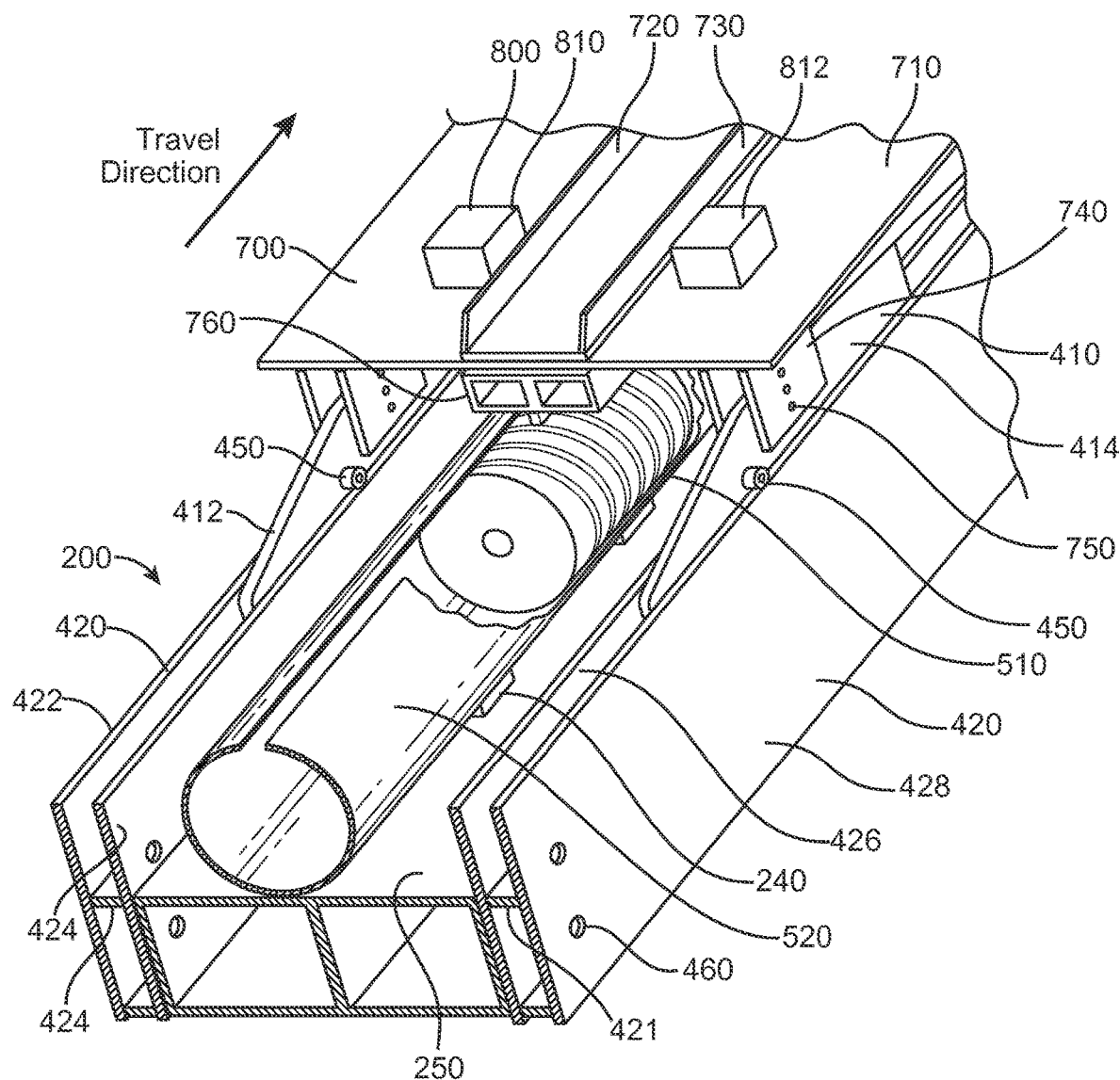
FIG. 3 is a perspective view of a bogie and a guideway according to an exemplary embodiment.
Figure 4:
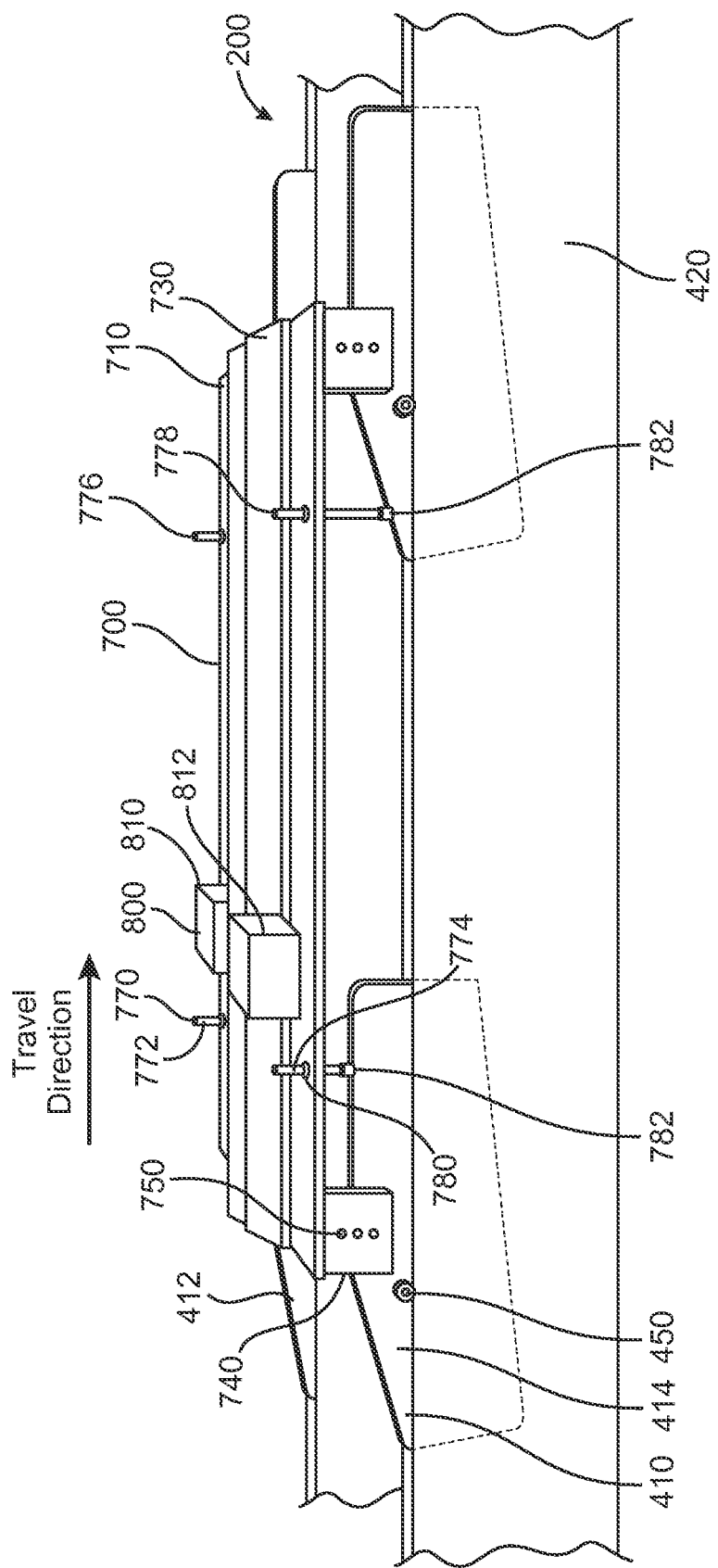
FIG. 4 is an elevation view of the bogie and guideway as illustrated in FIG. 3.

FIGS. 3 and 4 illustrate an alternative arrangement of a bogie 700, at least one levitation generator 410, at least one lifting member 420, at least one drive generator 510, at least one drive member 520, and a guideway 200. The direction of travel of the bogie 700 and its coupled components are indicated. As illustrated, there are four lifting members 420. In other embodiments, the number of lifting members can vary based on the location of the levitation generators 410. As shown, there is an outer left lifting member 422, an inner left lifting member 424, an inner right lifting member 426, and an outer right lifting member 428. The outer left lifting member 422 and inner left lifting member 424 can form a track. Likewise, the inner right lifting member 426 and outer right lifting member 428 can form another track. Thus, as illustrated two tracks are formed by the lifting members 420. While two tracks are illustrated, the number of tracks can be one or more. For example, when one track is implemented, the location of the track can be centered with respect to the guideway 200. Additionally, other tracks can be formed such as three tracks. Additionally, while the tracks as illustrated are formed from two lifting members 420, the track can be formed from a single lifting member 420. The tracks can be formed into segments such that the track is formed from a plurality of lifting members 420 arranged sequentially.

The at least one levitation generator 410 can be coupled to the bogie 700 via levitation generator couplers 740. While two levitation generator couplers 740 are illustrated, in at least one embodiment a single levitation generator coupler 740 can be implemented. The levitation generator couplers 740 include mounting points 750 which allow for variable positioning of the levitation generator 410 on the levitation generator couplers 740. As illustrated, the levitation generator couplers 740 can be configured such that there are two levitation generator couplers 740 for each levitation generator 410. In other embodiments, a single levitation generator coupler 740 can couple the levitation generator 410 to the bogie 700. In yet other embodiments, more than two levitation generator couplers 740 can be implemented to couple the levitation generator 410 to the bogie 700. For example, three or four levitation generator couplers 740 can be implemented. When more than one levitation generator coupler 740 is implemented for each levitation generator 410, the angle of the levitation generator 410 can be changed relative to the direction of travel. In at least one embodiment, the angle of the levitation generator 410 can be controlled via a controller that includes at least one processor and/or memory. The controller can be controlled remotely or based upon loading characteristics of the car or desired speed including congestion on the guideway.

In the embodiment as illustrated in FIG. 4, other angle adjustment mechanisms 770 can be implemented to control the angle of the levitation generator 410. As illustrated, there are four angle adjustment mechanisms 770, namely a front right angle adjustment mechanism 778, a front left angle adjustment mechanism 776, a rear right angle adjustment mechanism 774, and a rear left angle adjustment mechanism 772. Each of the angle adjustment mechanisms 770 are coupled to the bogie 700 at one portion 780 and coupled to one of the levitation generators 410 at another portion 782. The angle adjustment mechanism 770 can be a threaded coupler, for example a screw, a machine threaded coupler, or the like. In at least one embodiment, the angle adjustment mechanisms 770 can be controlled by a controller and servo motors. Other control mechanisms can also be implemented. In yet other embodiments, the angle adjustment mechanisms 770 can be maintain preset angles for the levitation generators 410. The angle of the levitation generator 410 and the properties associated therewith will be described hereinbelow. The control mechanism can be powered from the at least one energy storage device 800.

As illustrated, the bogie 700 includes at least one energy storage device 800. As illustrated there are two energy storage devices 800, a right energy storage device 810 and a left energy storage device 812. The energy storage device 800 can be in the form of a battery, a capacitor, or similar storage device. The energy storage device 800 can be used to store energy on the bogie 700 in case electrical connection between the bogie 700 and an external energy supply is temporarily disabled. Other configurations of energy storage devices 800 are also contemplated herein. For example, each levitation generator 410 can have its own individual energy storage device 800. Alternatively, a single energy storage device 800 can be provided on the bogie 700. In yet other embodiments, there can be no energy storage device 800 located on the bogie 700.

The drive generator 510 can be coupled to the bogie 700. The drive generator 510 can be coupled via a drive generator coupler 760 to the bogie 700. The bogie 700 has a top surface 710 which is oppose to the drive generator 510. The energy storage devices 800 can be mounted to the top surface 710. Additionally, the top surface 710 includes support pieces 720, 730 which are designed to strengthen and reinforce the top surface in the region around the drive generator coupler 760. Furthermore, the support pieces can be configured to allow for mounting of the drive generator coupler 760.

When the bogie 700 is operating at low speeds, the levitation forces generated by the levitation generators 410 can be too small to lift the bogie 700 from the guideway 200. One or more wheels 450 can be implemented to prevent the levitation generators 410 and drive generator 510 of the bogie 700 from contacting on the guideway 200. As illustrated, at least one wheel 450 for contacting a portion of the guideway 200 in the event that levitation forces are not enough to lift the wheel 450 from contacting the portion of the guideway 200. As illustrated in FIGS. 3 and 4, eight wheels 450 are implemented. Each of the eight wheels 450 is configured to contact a portion of a respective one of the lifting member 420. In other embodiments, the at least one wheel 450 can include at least two wheels. In another embodiment, the at least one wheel can include at least four wheels. As illustrated, the at least one wheel 450 is coupled to at least one levitation generator 410.

Figure 5:
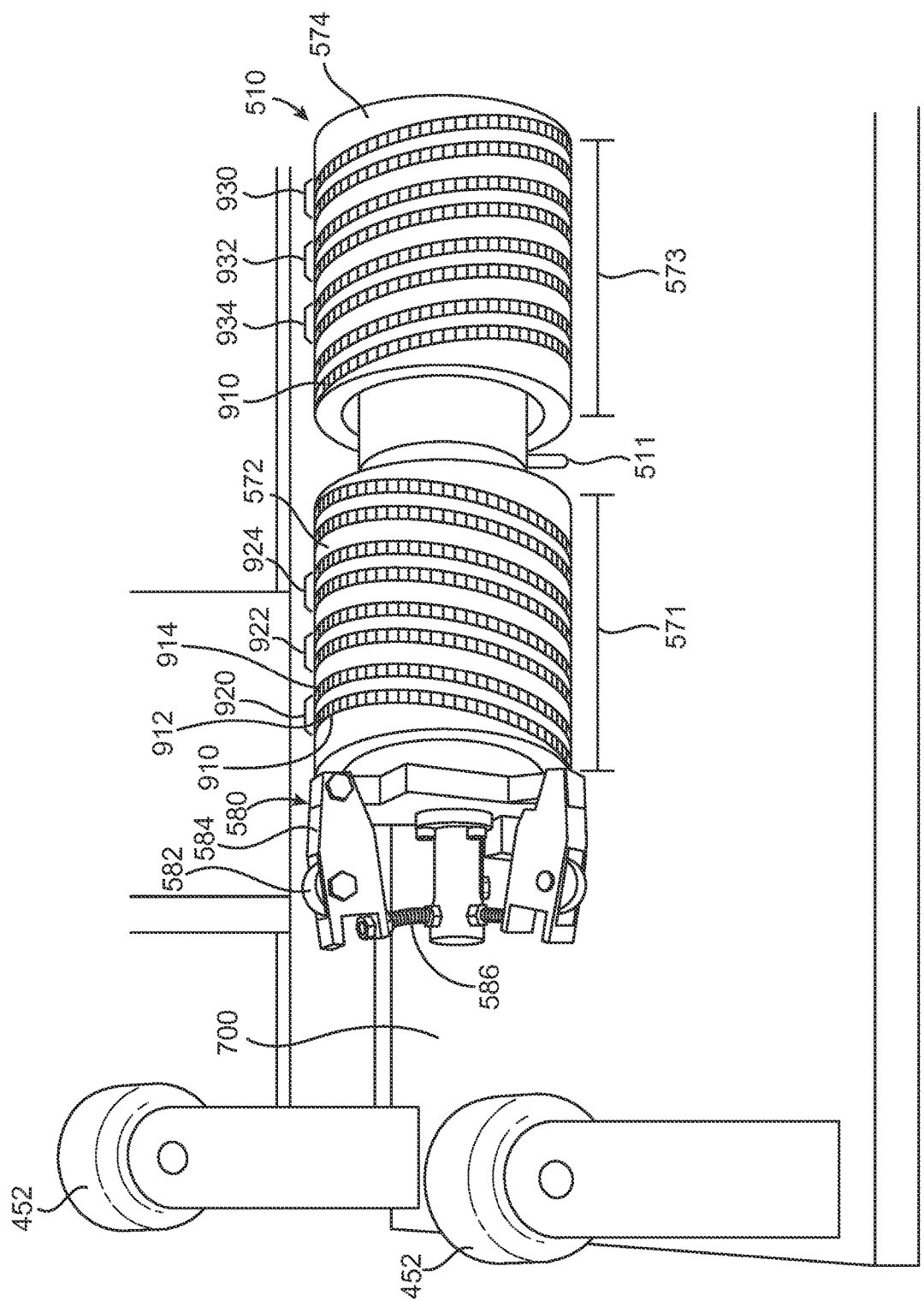
FIG. 5 is an inverted perspective view of a drive generator coupled to a bogie according to an exemplary embodiment as illustrated in FIG. 3.

In other embodiments, such as the one shown in FIG. 5, wheels 452 can be coupled to the bogie 700 and contact another portion of the guideway 200. For example, the wheels 452 can be configured to contact the drive member support portion 250 of the guideway 200 (see FIG. 3). These wheels 452 can be implemented in addition to the wheels 450 as described above or in place of the wheels 450. While wheels have been described herein other configurations can make use of other mechanisms designed to allow two components to move in relation to one another while reducing the frictional forces therebetween. For example, this can include specially coated surfaces, bearing surfaces, rolling members and the like.

Each of the at least one drive generators motors (not shown) can be coupled to one of the at least one energy storage device 800. As described above, the levitation generators as described herein can operate without the need for electrical power; however in at least one embodiment, each of the at least one levitation generator can be coupled to one of the at least one energy storage device 800. When the levitation generators are coupled to the energy storage device 812 the levitation generators can be configured to provide a lifting force when the levitation generators are not moving with respect to the lifting members. The addition of the ability generate levitation forces when the levitation generator is stationary or moving at speeds below which the lifting force generated is not substantial enough can allow for the elimination or at least a reduction in the robustness of the driving support wheels that are described herein. In at least one embodiment, the levitation generators can be configured to receive power when the speed of the bogie is below a predetermined value, such that an additional levitational force can be generated at low speeds so as to prevent the bogie from contacting the guideway.

Figure 14:
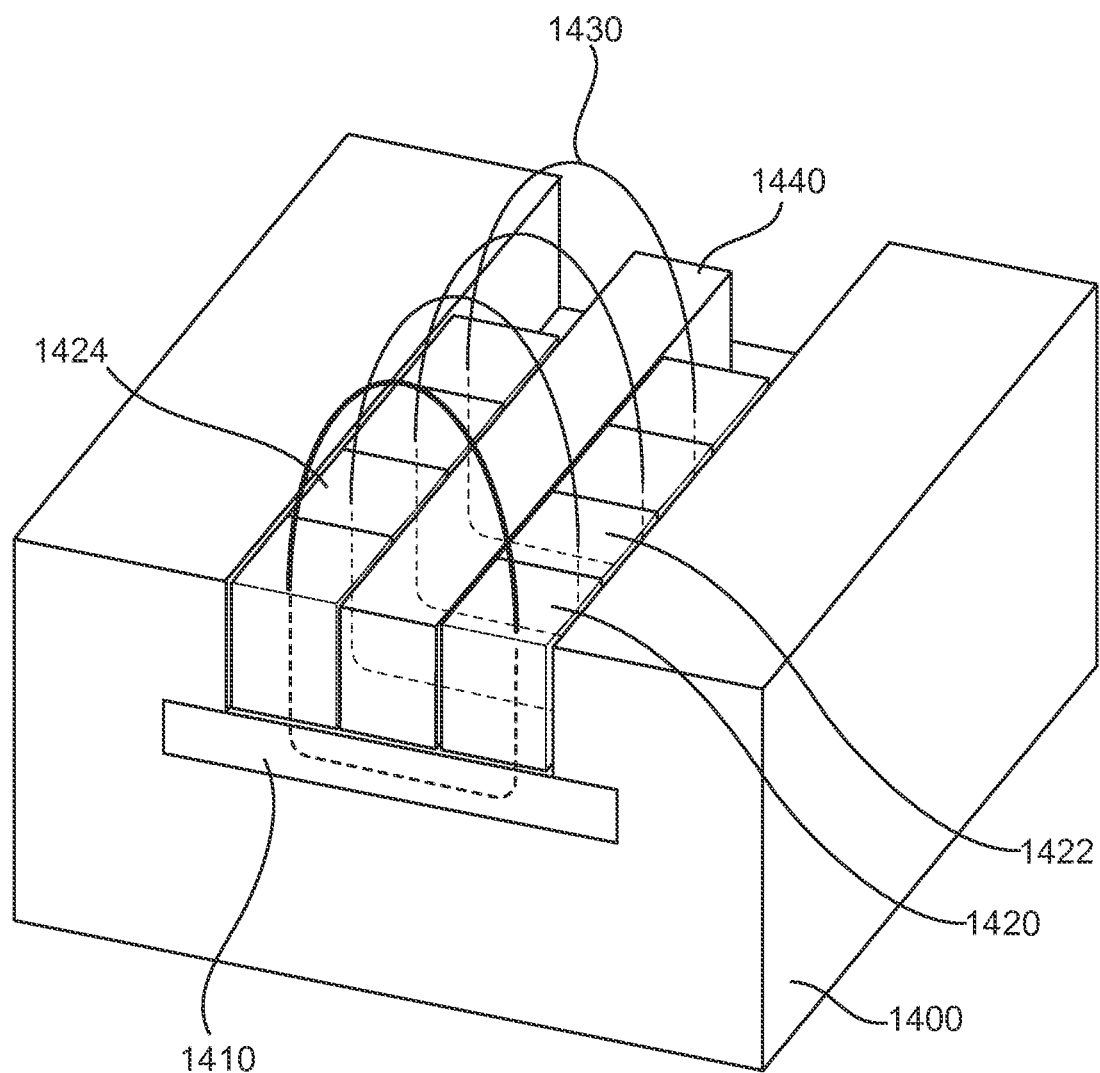
FIG. 14 is an exemplary arrangement of a plurality of magnetic elements in an exemplary arrangement.

FIG. 5 is an inverted perspective view (from the bottom of the bogie 700) of a drive generator 510 coupled to a bogie 700 according to an exemplary embodiment. The drive generator 510 can be coupled to the bogie 700 via a drive coupler 511. As illustrated, the drive generator 510 includes at least one substantially cylindrical member 572. A plurality of a plurality of magnets 910 are located on the surface of the at least one substantially cylindrical member 572. In the illustrated embodiment, the plurality of magnets 910 are arranged so as to form a helix. In the illustrated embodiment, the plurality of magnets 910 are arranged in a plurality of rows 920, 922, 924 with one pole 912, 914 on each side of the row 920, 922, 924. For example on the first cylindrical member 572, there are three rows of magnets 920, 922, 924, namely a first row 920, a second row 922, and a third row 924. Likewise, the second cylindrical member 574 includes a plurality of magnets 910 arranged in three rows 930, 932, 934, namely a first row 930, a second row 932, and a third row 934. The two different poles can be spaced apart by a predetermined distance. The two different poles can be coupled to a backing member. For example, see the arrangement of magnets and backing member as illustrated in FIG. 14. In at least one embodiment, the plurality of magnets 910 are arranged in at least one row and the plurality of magnets 910 are mounted to a backing member, such that the backing member and plurality of magnets 910 can be removed from the cylindrical member 572. The first cylindrical member has a length 571, and the second cylindrical member has a length 573. In the illustrated embodiment, the lengths 571 and 573 are substantially the same.

When the drive generator 510 is powered by the motor 530 and causing motion of the bogie 700, the drive generator 510 centers itself within the drive member 520. However, at low speeds, at stationary conditions, when the drive generator 510 is starting or stopping motion, the driving magnetic flux generated can be less than required to center the drive generator 510 within the driving member 520. In order to prevent damage to system and especially to the drive generator 510 during the situations where the driving magnetic flux is below what is necessary to center the drive generator 510, the drive generator 510 can also include a self-centering mechanism 580. The self-centering mechanism 580 allows the drive generator 510 to be centered within the drive member (not shown). The self-centering mechanism 580 can include one or more resting drive wheels 582 that are coupled to the drive generator 510 via wheel couplers 584. Additionally, the distance the resting drive wheels 582 protrude beyond the outer surface of the cylinders 572, 574 can be adjusted by wheel adjustment mechanism 586. By having the resting drive wheels 582 extend just beyond the outer surface of the cylinders 572, 574, the drive generator 510 can move within drive member 520 without the resting drive wheels 582 excessively touching the drive member 520. The self-centering mechanism 580 prevents the cylinders 572, 574 from contacting the drive member 520 at low speeds and in conditions where the drive generator might be positioned too close to the drive member 520. As illustrated, there are three resting drive wheels 582. In at least one embodiment, at least one resting drive wheel 582 is configured to contact the corresponding drive member 520 when the speed of the drive generator 510 is below a predetermined speed. In at least one embodiment, the at least one resting drive wheel 582 is configured to be controlled by a deployment driver so that the at least one resting drive wheel 582 is flush with the cylindrical member 572, 574 in a driven state and extends beyond the cylindrical member 572, 574 in a low speed driven or non-driven state. In at least one embodiment, the resting drive wheels 582 are non-powered wheels such that they are configured for rolling only. In yet other embodiments, the drive wheels can be powered to provide some assistance when the drive generator 510 is operating at low speeds or starting from a stop.

Figure 6:
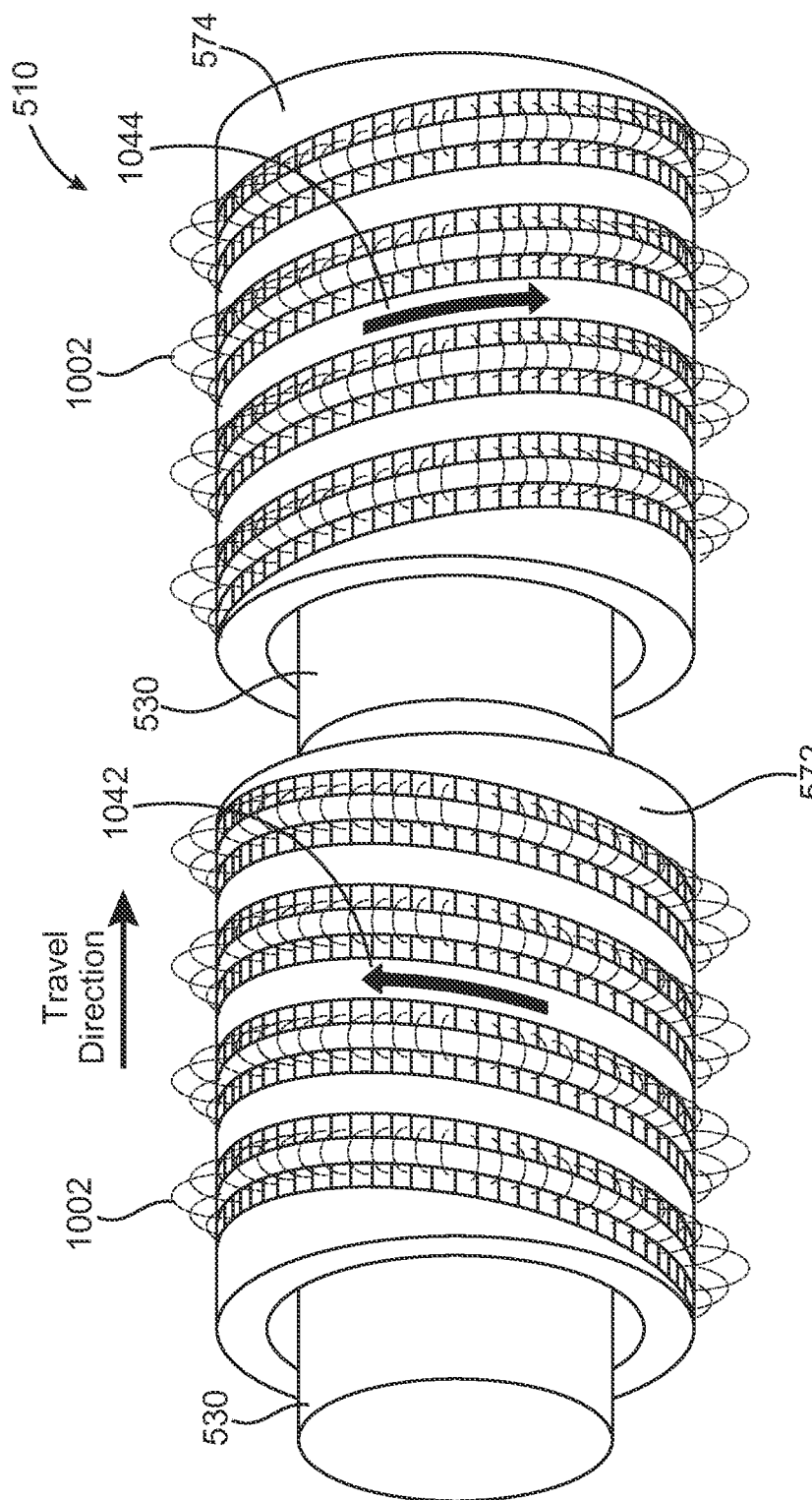
FIG. 6 is a perspective view of a portion of a drive generator according to an exemplary embodiment, wherein illustrative magnetic flux lines are shown.
Figure 8:
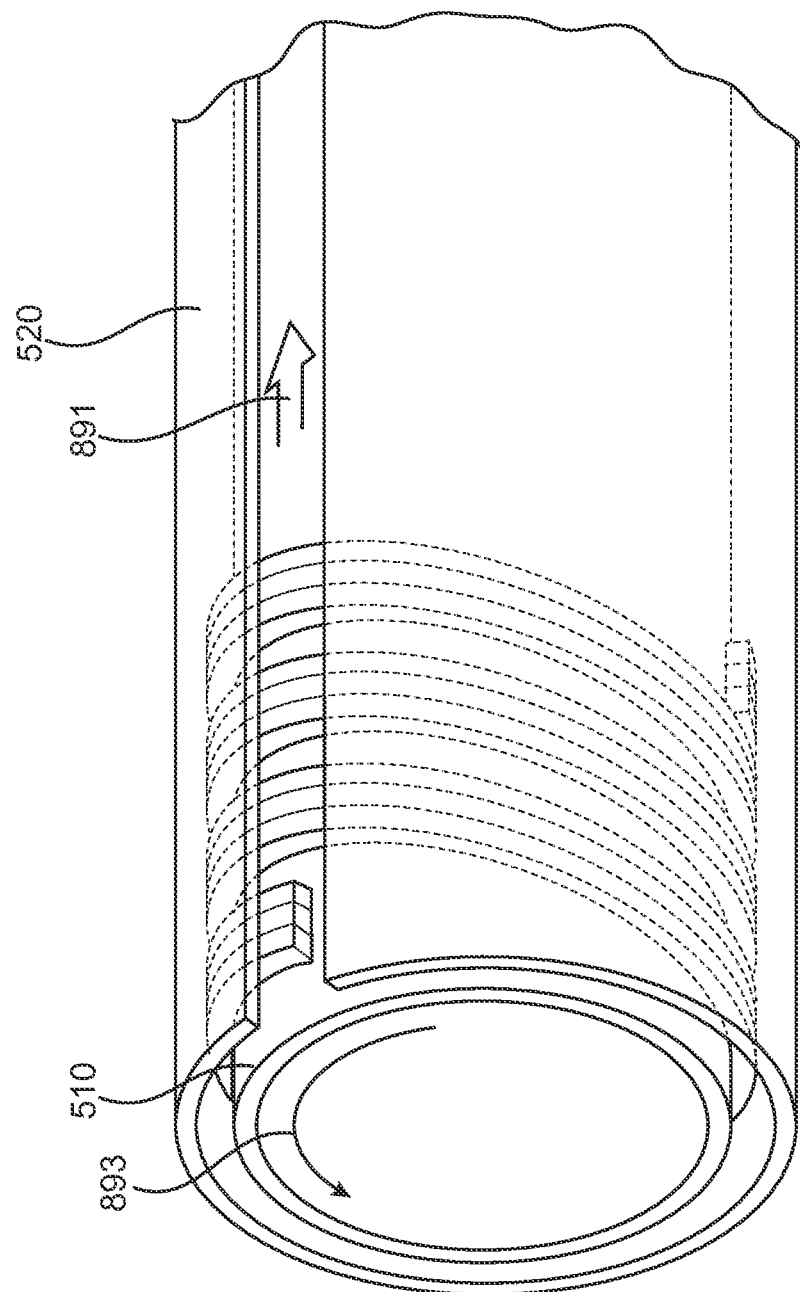
FIG. 8 is perspective view of a portion of an exemplary drive generator within an exemplary drive member according to an exemplary embodiment.

FIG. 6 is a perspective view of a portion of a drive generator 510 according to an exemplary embodiment. The plurality of magnets 910 are arranged as in FIG. 5, but the labels have been omitted for clarity. In the illustration of FIG. 6, illustrative magnetic flux lines 1002 are shown. As shown, a rotational motor 530 for rotating the at least one substantially cylindrical member 572, 574 such that the rotation 1042, 1044 of the at least one substantially cylindrical member 572, 574 produces a helically varying magnetic flux in the corresponding drive member 520 so as to cause the drive generator 510 to move in relation to the corresponding drive member 520. When two substantially cylindrical members 572, 574 are provided such as in FIG. 6, each substantially cylindrical member 572, 574 can be coupled to a respective rotational motor 530, so that the substantially cylindrical member 572, 574 is rotated. In another embodiment, the two substantially cylindrical members 572, 574 can be rotated by the same rotational motor. In the illustrated example, each of the two substantially cylindrical members 572, 574 is rotated in a direction opposite to the other. In other embodiments, the two substantially cylindrical members can be rotated in the same direction. The motion of the drive generator 510 in relation to the drive member 520 is illustrated in FIG. 8.

The drive generator 510 can also be configured to slow motion down. In at least one embodiment, relative substantially linear motion between the at least one substantially cylindrical member 572, 574 of the drive generator 510 and corresponding drive member 520 can cause the at least one substantially cylindrical member 572, 574 to rotate. As indicated above, the rotation of the at least one substantially cylindrical member 572, 574 can cause substantially linear motion of the drive generator 510 relative to the drive member 520. The rotation of the at least one substantially cylindrical member 572, 574 can be caused by the motor 530. In at least one embodiment, the at least one substantially cylindrical member 572, 574 can be coupled to an electrical generator. The electrical generator rotates and produces electrical power in order to slow the substantially linear motion of the at least one substantially cylindrical member 572, 574 relative to the drive member 520. In at least one embodiment the motor 530 can also be configured as the electrical generator such that the motor 530 generates a rotational force to be applied on the drive generator 510 when powered, and operates as an electrical generator when no power is supplied to the motor 530.

Alternatively, the at least one drive generator 510 can include a portion that has a magnetic pole that is curved so as to form a helix. The magnetic pole can be formed on the exterior of the drive generator 510 such that it forms a portion of the exterior of one of the at least one drive generators 510. The at least one drive generator 510 can be configured to rotate relative to a respective one of said at least one drive member 520. The rotation of the portion of the at least one drive generator 510 induces an eddy current in the respective one of said at least one drive member 520.

Figure 7:
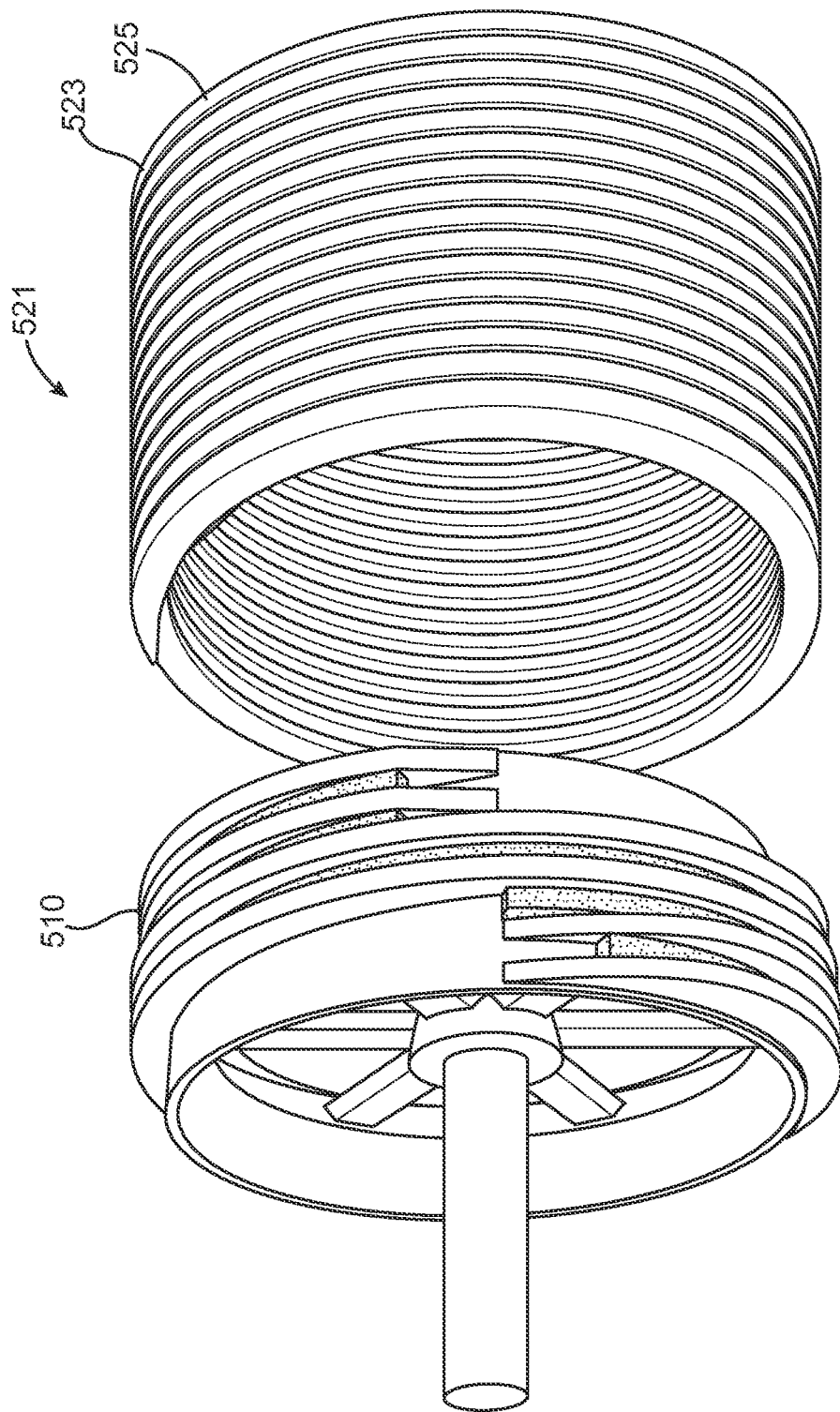
FIG. 7 is a perspective view of a portion of an exemplary drive generator and a portion of an exemplary drive member according to an exemplary embodiment of the present disclosure.

FIG. 7 is a perspective view of portion of an exemplary drive generator 510 and a portion of an exemplary drive member 521 according to an exemplary embodiment of the present disclosure. In the illustrated example, the drive member 521 can include an electrical armature 523 with substantially helically wound polyphase electrical conductors 525. The electrical armature 523 can be supplied with electrical currents to cause rotational force on a corresponding one of the at least one drive generator 510. The electrical armature 523 can be supplied with electrical currents to cause a linear force a corresponding one of the at least one drive generator 510. The rotation of a corresponding one of the at least one drive generators 510 causes electrical currents to flow within the armature 523. Linear motion of a corresponding one of the at least one drive generators 510 causes electrical currents to flow within the armature 523.

FIG. 8 illustrates a drive member 510 situated within a drive member 520. As illustrated the drive member moves from left to right (see arrow 891). The motion of the drive member 510 in relation to the drive member 520 is caused by the rotation of the drive member in the direction as illustrated by arrow 893. The rotation of the drive generator 510 can be in response to the motion imparted from the drive motor (not shown).

Figure 9:
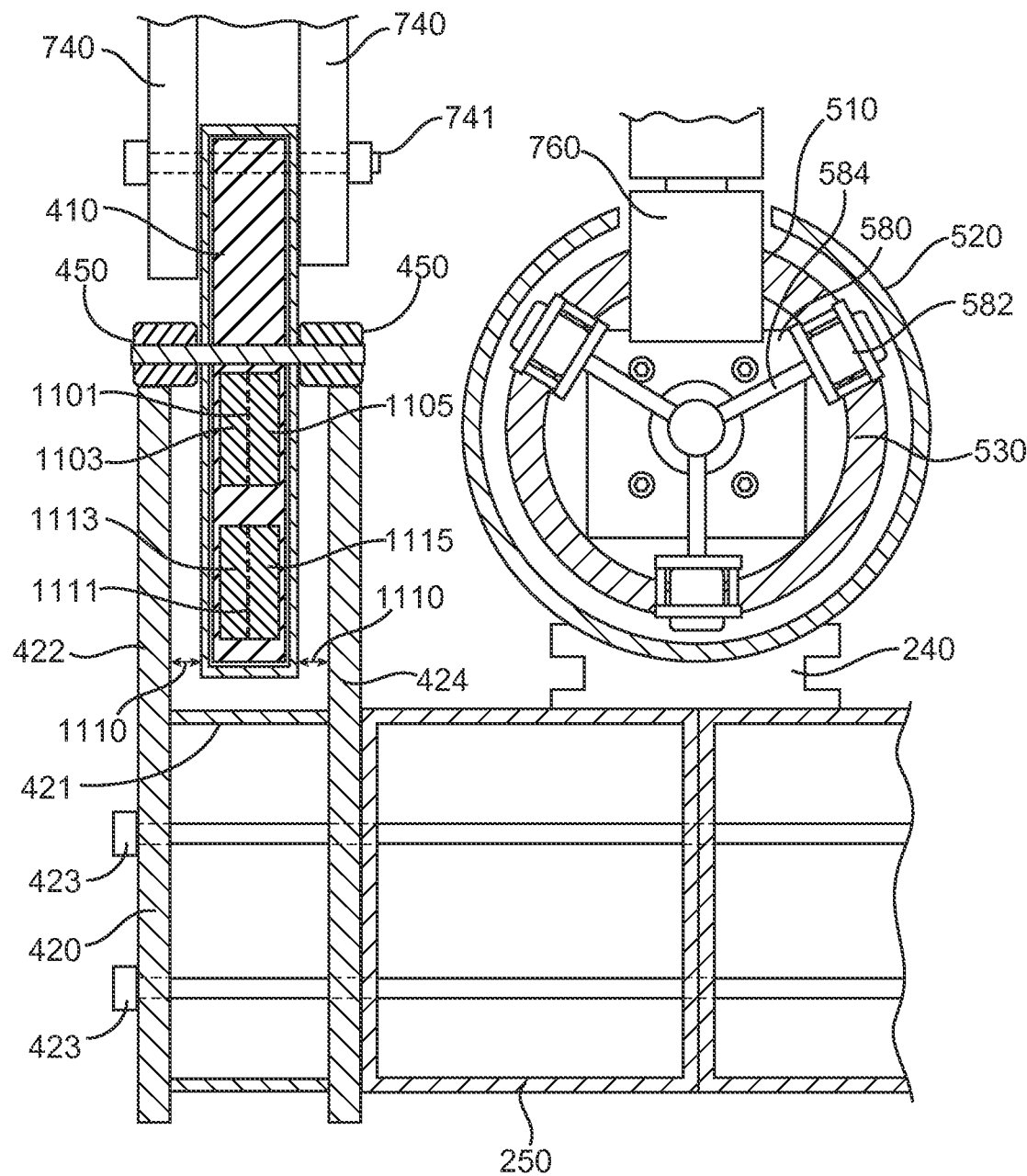
FIG. 9 is an elevational cross-section view of an exemplary drive generator, drive member, levitation generator, and levitation member according to an exemplary embodiment of the present disclosure as illustrated in FIG. 3.

FIG. 9 is an elevational cross-section view of an exemplary drive generator 510, drive member 520, levitation generator 410, and levitation member 420 according to an exemplary embodiment of the present disclosure.

The drive generator 510 is illustrated within a drive member 520. The drive generator 510 can be coupled to a self-centering mechanism 580 as described above. The self-centering mechanism 580 can include one or more resting drive wheels 582. As illustrated, there are three resting drive wheels 582. The resting drive wheels 582 allow for the drive generator 510 to be protected from touching the inside of the drive member 520 during operation, including low and high speeds. While wheels have been described herein other configurations can make use of other mechanisms designed to allow two components to move in relation to one another while reducing the frictional forces therebetween. For example, this can include specially coated surfaces, bearing surfaces, rolling members and the like. The drive generator 510 can be coupled to the bogie (not shown) via drive generator coupler 760.

The drive member 520 can be coupled to a drive member support 240. In at least one embodiment, the drive member 520 can float on the drive member support 240 so as to allow for expansion of the drive member 520 in an axial direction so to prevent buildup of stress. The drive member support 240 can in turn be coupled to the guideway support 250. The guideway support 250 can in turn be coupled to one or more lifting members 420 via guideway support couplers 423.

As illustrated, a levitation generator 410 is illustrated on the left hand side of FIG. 9. The levitation generator 410 is positioned between levitation generator couplers 740. The levitation generator couplers 740 are coupled to levitation generator 410 by a coupling device 741. The coupling device 741 as illustrated is a bolt that extends through the levitation generator couplers 741 and levitation generator 410. Additionally, two wheels 450 are illustrated. The two wheels 450 are configured to contact a top portion of the two lifting members 420. As described above, the two wheels 450 contact the top portion of the two lifting members 420 when not enough lifting force is supplied, for example at low speed. As illustrated, the two wheels 450 are coupled to the levitation generator 410. In at least one embodiment, a single wheel can be implemented. Furthermore, the configuration as illustrated can be the same for each of the levitation generators 410 or the configuration can be different.

As illustrated, two lifting members 420 are shown. The two lifting members 420 are configured so as to allow at least a portion of the levitation generator 410 to pass therethrough. Additionally, a bottom piece 421 can be provided so as to bridge the space between the two lifting members 420. As illustrated the levitation generator 410 is centered laterally within the two lifting members 420, such that a distance 1110 separates the levitation generator 410 from the lifting members 420. During operation, the distance 1110 on the left side and the right side of the levitation generator 410 can change to some extent as needed. As shown the two lifting members 420 form a track. The track can be considered substantially rectangular in cross-section. The track as illustrated has three sides (formed by the outer right lifting member 422, inner right lifting member 424, and the bottom piece 421) such that the top side is exposed to allow the levitation generator 410 to pass therethrough. While only one track is shown in FIG. 9, any number of tracks can have the same cross-sectional configuration. For example, when there are two tracks such as the one illustrated in FIG. 3, each of the two tracks can have similar cross-sections. In other embodiments, the track can be formed from a single lifting member.

The levitation generator 410 as illustrated includes at least one elongate magnetic pole 1102, 1104. As there are two elongate magnetic poles 1102, 1104. In other embodiments, more than two elongate magnetic poles 1102, 1104 can be implemented as well. Further examples of the elongate magnetic poles 1102, 1104 are provided below.

Figure 10:
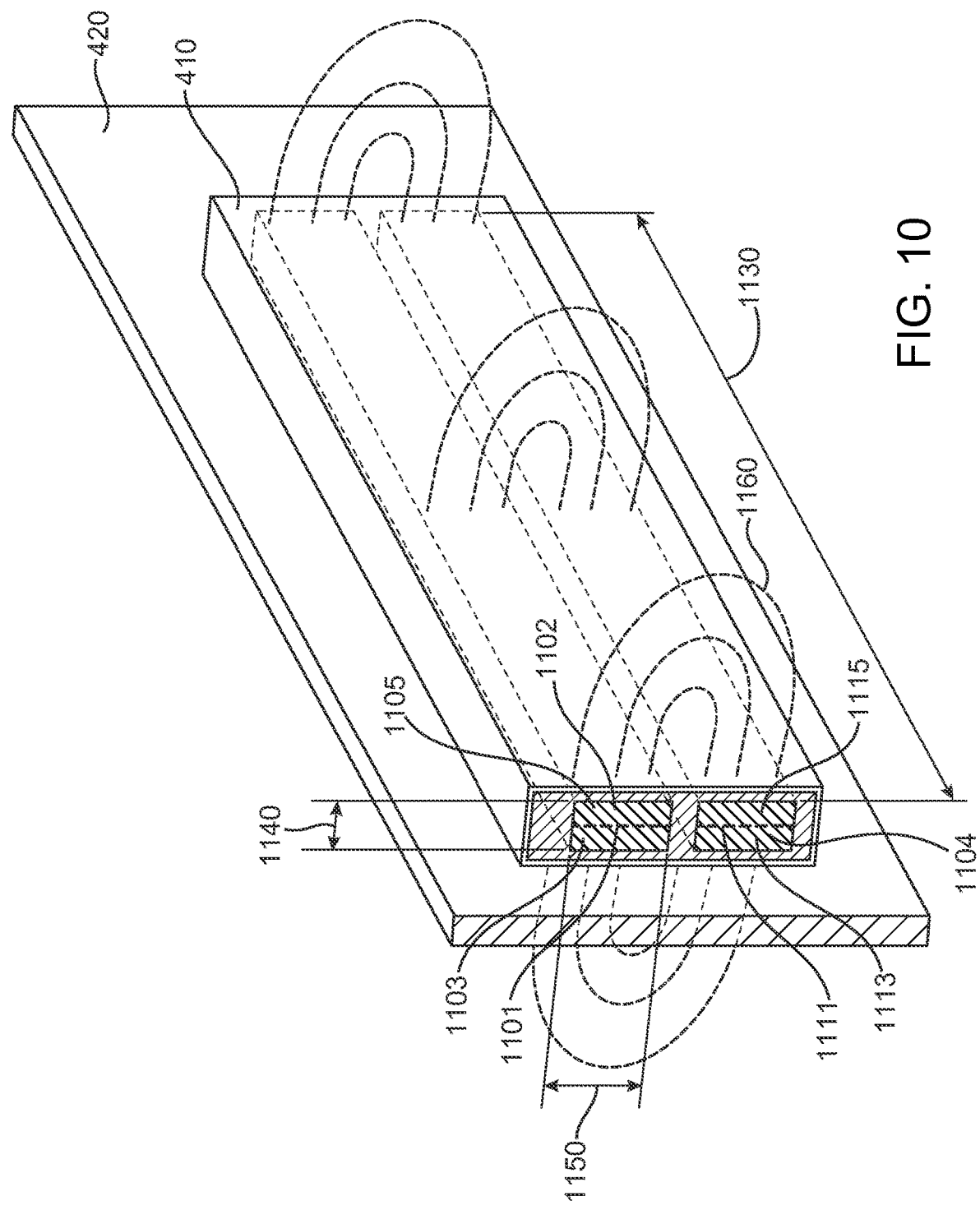
FIG. 10 is an illustrative example of an elongate magnetic pole within an exemplary levitation generator and the magnetic flux produced therefrom interacting with an exemplary levitation member.

FIG. 10 is an illustrative example of a magnetic pole 1102, 1104 within an exemplary levitation generator 410, and the magnetic flux 1160 produced therefrom interacting with an exemplary levitation member 420. As illustrated, there are two elongate magnetic sources 1102, 1104. The upper elongate magnetic source 1102 has been labeled to indicate the dimensions as used herein. The upper elongate magnetic source 1102 has a length 1130 that is its largest dimension. The upper elongate magnetic source 1102 also has a width 1140 and a height 1150. As illustrated the elongate magnetic source 1130 has a length that is substantially larger than either the height 1150 or the width 1140. In at least one embodiment such as the one illustrated, the upper elongate magnetic source 1102 can have a north pole 1103 on the left side and a south pole 1105 on the right side (line 1101 indicates the separation of the two poles). The lower elongate magnetic source 1104 can have a south pole 1113 on the left side and a north pole 1115 on the right side (line 1111 indicates the separation of the two poles). When the poles are oriented as described, the flux lines 1160 are generated by the magnetic sources 1102, 1104. In other embodiments, only a single magnetic source can be present. In yet other embodiments, the pole orientation can be reversed as to what has been described above.

Additionally as illustrated, the at least one levitation generator 410 has at least one magnetic pole surface 1102, 1104. The at least one magnetic pole surface 1102, 1104 generates a lifting flux field 1160 and at least a portion of the lifting member 420 intersects the flux field 1160 from the levitation generator 410. The levitation generator 410 can cause an electrical eddy current to form within at least a portion of the lifting member 420, in the event the at least one levitation generator 410 moves relative to the at least one lifting member 420. In at least one embodiment, the lifting force can be dependent upon the length 1130 of the at least one elongate magnetic pole 1102, 1104 relative to the width 1140 and the height 1150 of the elongate magnetic pole 1102, 1104, wherein the lifting force increases as the length 1130 is greater as compared to the width 1140 and height 1150. Thus, when the length of the elongate magnetic pole 1102, 1104 is increased for a given width 1140 and height 1150, the lifting force is increased. In at least one embodiment, decreasing the width 1140 and height 1150 relative to a given length does not result in an increased lifting force.

The levitation generator 410, as illustrated in FIG. 10 can be shaped as a cuboid member. In other embodiments, the levitation generator 410 can take on other shapes such that it is an irregular shape but has a dimension that is greater in the length than the width or height. In the illustrated embodiment, the cuboid member can be configured to be magnetically coupled with the lifting member 420. Furthermore, the cuboid member can have at least one magnetic pole 1102, 1104 configured to generate a lifting flux field 1160 for intersecting at least a portion of the lifting member 420.

The lifting flux field 1160 generated by the elongate magnetic pole 1102, 1104, as it moves in relation to the lifting member 420, penetrates and extends beyond the lifting member 420 as shown. This lifting flux field 1160 is dependent upon a variety of factors as will be explained below in relation to FIGS. 11A and 11B.

Figure 11A:
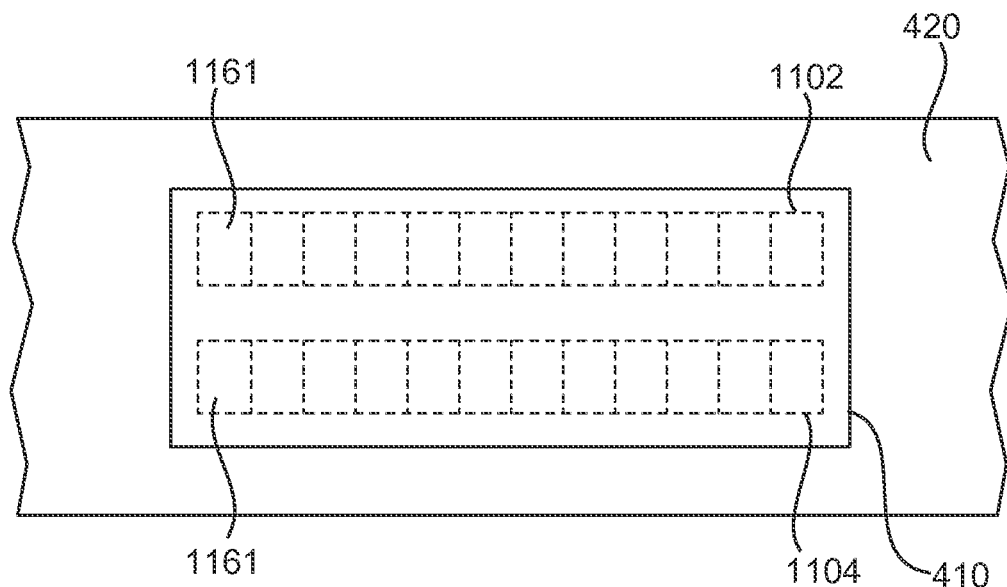
FIGS. 11A and 11B are illustrative examples of a levitation generator and one or more elongate magnetic pole.
Figure 11B:
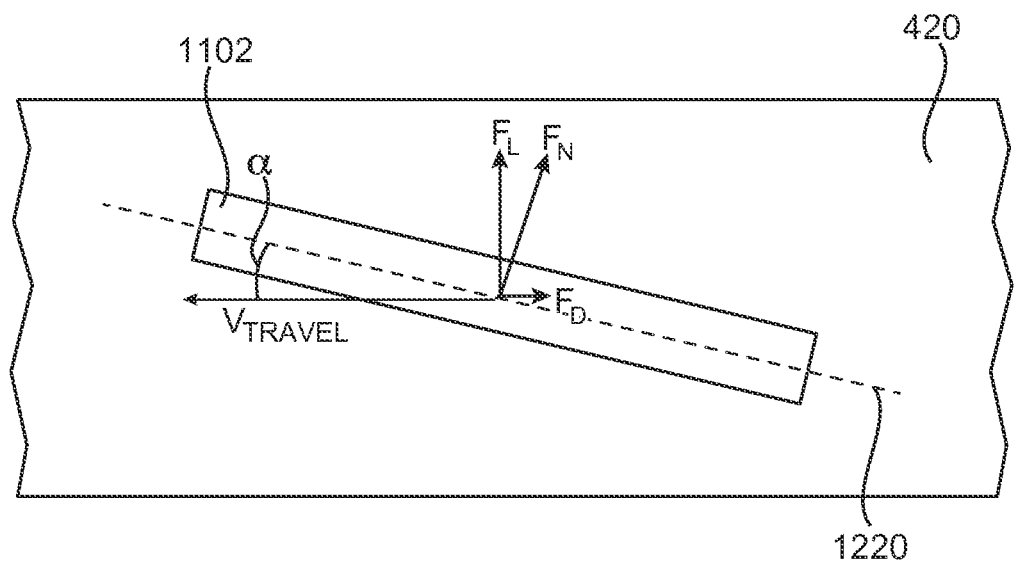

FIGS. 11A and 11B are illustrative examples of a levitation generator 410 and one or more elongate magnetic poles 1102, 1104. In FIG. 11A, a levitation generator 410 having two elongate magnetic poles 1102, 1104 is illustrated. As shown, there is an upper elongate magnetic pole 1102 and a lower elongate magnetic pole 1104. The upper elongate magnetic pole 1102 and lower elongate magnetic pole 1104 include a plurality of magnetic elements 1161. The plurality of magnetic elements 1161 are arranged so as to form the elongate magnetic pole. As shown, the plurality of magnetic elements 1161 is arranged in a row. In other embodiments, the magnetic elements 1161 can be arranged in a curvilinear array or other shape.

In order to provide a clearer diagram, FIG. 11B has been provided to show a single elongate magnetic pole 1102, but both elongate magnetic poles 1102, 1104 would function in similar fashion. The levitation generator 410 (illustrated in FIG. 11A) can cause an electrical eddy current to form within at least a portion of the at least one lifting member 420 when the levitation generator 410 moves relative to the lifting member 420. The relative motion of the levitation generator 410 can be caused by the drive generator 510 (shown in FIG. 5) and drive member 520 (shown in FIG. 5) as described herein. The electrical eddy current can be dependent upon an angle ($\alpha$) between a direction velocity vector $V_{TRAVEL}$ representing a direction of motion of the at least one levitation generator 410 relative to the at least one lifting member 420 and the axis 1220 of at least one magnetic pole 1102 of the levitation generator 410. The levitation generator 410 produces a lifting force ($F_L$) that is dependent upon the relative velocity between the levitation generator 410 and corresponding lifting member 420. In at least one embodiment, the lifting force ($F_L$) that is produced can be independent of the relative position of the levitation generator 410 relative to the lifting member 420. For example, as the levitation generator 410 rises with respect to the lifting member 420, the lifting force ($F_L$) can remain constant. In another example as the levitation generator 410 laterally approaches the lifting member 420, the lifting force ($F_L$) can remain constant.

As illustrated in FIG. 11B, the elongate magnetic pole 1102 is shown in relation to a lifting member 420. As shown the elongate magnetic pole 1102 moves with a velocity ($V_{TRAVEL}$) in the direction of travel. The normal velocity ($V_N$) of the elongate magnetic pole 1102 can be calculated as $V_N = \sin(\alpha) * V_{TRAVEL}$, where $\alpha$ is the angle formed between the travel direction and long axis 1220 of the elongate magnetic pole 1102. For a given configuration of the elongate magnetic pole 1102, it is possible to derive a normal velocity constant $K_{FN}$ and peak velocity $V_{PEAK}$. Once the values of $K_{FN}$ and $V_{PEAK}$ are known, it is possible to determine the normal force ($F_N$) using the following formula, $F_N = K_{FN} * (V_N * V_{PEAK})/(V_N^2 + V_{PEAK}^2)$. Once the normal force ($F_N$) has been calculated it is possible to determine the lifting force ($F_L$) and drag force ($F_N$) using the following formulas: $F_L = \cos(\alpha) * F_N$; $F_D = \sin(\alpha) * F_N$. Under some typical operating conditions, the value of angle $\alpha$ is small so $F_L$ approaches $F_N$, while $F_D$ is a small fraction of $F_N$. Also under some typical operating conditions, the values of $V_N$ is much less than the value of $V_{PEAK}$ so $F_N$ is approximately, $K_{FN} * V_N$, $F_L$ is approximately $\cos(\alpha) * \sin(\alpha) * K_{FN} * V_{TRAVEL}$, and $F_D$ is approximately $\sin(\alpha) * \sin(\alpha) * K_{FN} * V_{TRAVEL}$. Thus, it can be understood that a low angle of attack ($\alpha$) increases the lift-to-drag ratio.

In view of the forgoing formulas, the following statements can apply. When the elongate magnetic pole 1102, 1104 is oriented at an angle relative to the direction of relative motion a normal force component is generated in a direction normal to the direction of relative motion. This normal force, $F_N$, has components in the lifting direction, $F_L$, and in the drag direction, $F_D$. $F_L$ is $\cos(\alpha) * F_N$ and at typical low values of $\alpha$ is very close to $F_N$. $F_D$ is $\sin(\alpha) * F_N$ and is typically a small fraction of $F_N$. Additionally, the angle ($\alpha$) can be a predetermined angle based on a magnetic force versus normal velocity constant $K_{FN}$, the relative velocity between the levitation generator 410 and the lifting member 420, and the lifting force required. In another embodiment, the angle is a variable angle based on magnetic force versus normal velocity constant $K_{FN}$, the relative velocity between the at least one levitation generator 410 and the at least one lifting member 420, and the lifting force required. The lifting force can be dependent upon the velocity ($V_{TRAVEL}$) of the elongate magnetic pole 1102, 1104 relative to the at least one lifting member 420, wherein a higher velocity ($V_{TRAVEL}$) produces greater lift ($F_L$).

Figure 12:
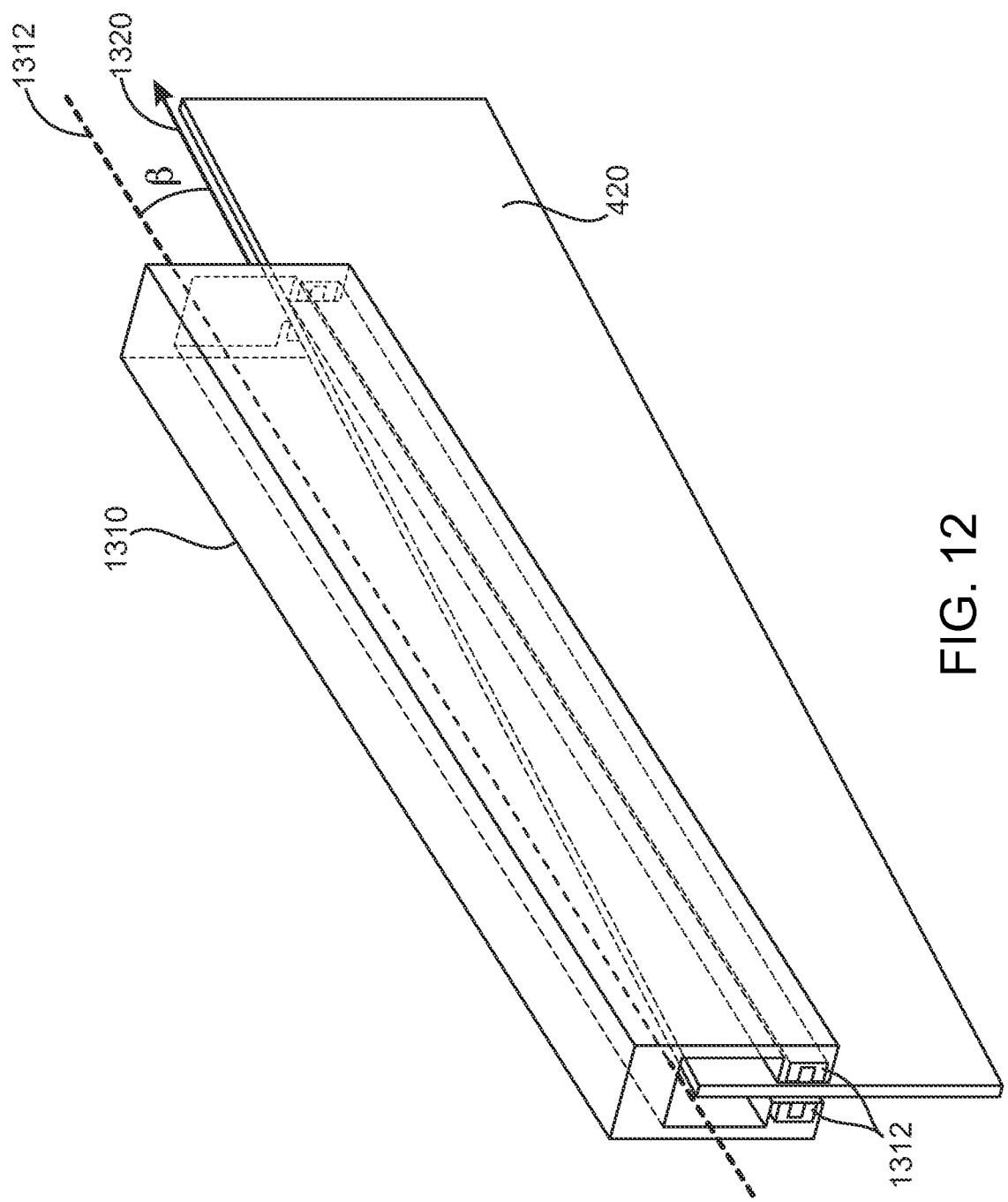
FIG. 12 is an another illustrative example of an alternative levitation generator and corresponding levitation member according to an exemplary embodiment.

FIG. 12 is another illustrative example of an alternative levitation generator 1310 and a corresponding levitation member 420 according to an exemplary embodiment. The levitation generator 1310 differs from the above described levitation generators in that it is configured as a female arrangement in relation to the lifting member 420 in comparison to the above described levitation generators which were male configurations. In the female levitation generator 1310, the lifting member 420 is configured to be inserted between two sides of the levitation generator 1310. The levitation generator 1310 can have two elongate magnetic poles 1312 that operate in a similar fashion as the ones described above. In the female configuration, the levitation generator 1310 produces forces by passing the magnetic flux through the lifting member 420 to the other part of the levitation generator 1310. Implementing the female levitation generator 1310 can result in higher levels of magnetic flux density through the lifting member and an increased levitation force as compared with a male levitation generator.

As illustrated the female levitation generator 1310 moves in travel direction 1320. The female levitation generator 1310 like the male levitation generators as described above can be oriented at an angle ($\beta$) to produce the lifting forces in a similar way as described above. As illustrated angle ($\beta$) is formed between the axis of the female levitation generator 1310 and the direction of travel 1320.

Figure 13:
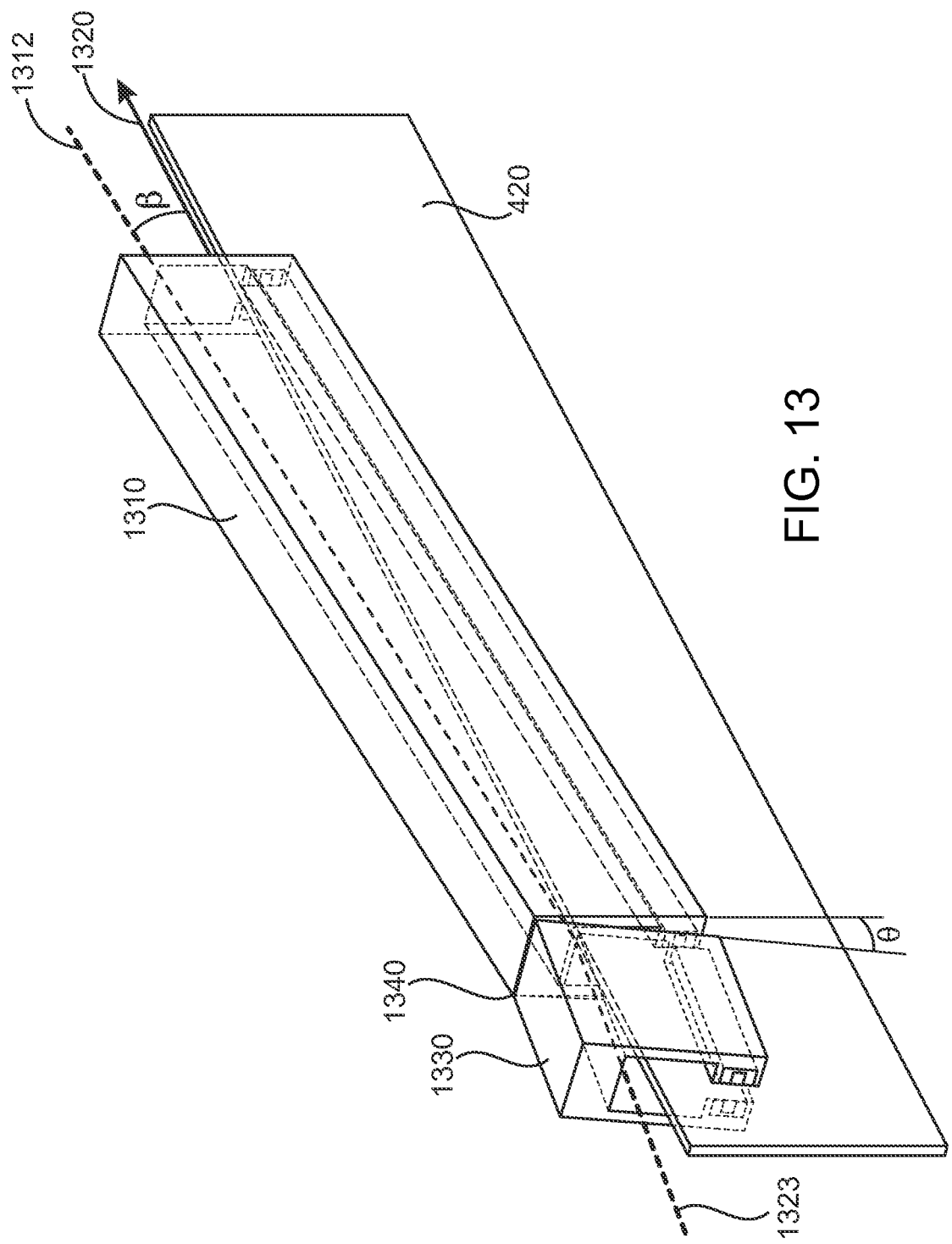
FIG. 13 is an illustrative example of the levitation generator and corresponding levitation member of FIG. 12 wherein a first levitation generator is coupled to a second levitation generator by an articulation joint.

FIG. 13 is an illustrative example of the levitation generator 1310 and the corresponding lifting member 420 of FIG. 12 wherein a first levitation generator 1310 is coupled to a second levitation generator 1330 by an articulation joint 1340. In at least one embodiment, at least a portion of the plurality of levitation generators 1310, 1330 can be coupled to one another via at least one articulation joint 1340. As indicated above, the levitation generator 1310 causes electrical eddy current to form within at least a portion of the lifting member 420, in the event the at least one levitation generator 1310 moves relative to the at least one lifting member 420. The electrical eddy current can be dependent upon an angle ($\beta$) between a direction vector 1320 representing a direction of motion of the levitation generator 1310 relative to the lifting member 420 and the axis 1312 of at least one magnetic pole surface of the levitation generator 1310. The eddy current is further dependent upon a degree of articulation of the articulation joint 1340. While the articulation joint 1340 has been illustrated with respect to the female levitation generator 1310, the articulation joint 1340 can be implemented with any of the above described levitation generators, including the male levitation generators. Additionally, while only a single female levitation generator 1310 has been illustrated, in at least one embodiment a plurality of female levitation generators 1310 can be implemented. In yet other embodiments, one or more of the female levitation generators 1310 can be implemented in conjunction with one or more male levitation generators

410. As illustrated there is an angle (θ) formed between the two end adjoining surfaces of the first levitation generator 1310 and the second levitation generator 1330. The angle (θ) can be controlled by the amount that the at least one articulation joint 1340 allows for motion of the first levitation generator 1310 relative to the second levitation generator 1330.

FIG. 14 is an exemplary arrangement of a plurality of magnetic elements 1420 in a block 1400. While block 1400 is illustrated in FIG. 14, the arrangement of the magnetic elements 1420 can be implemented with respect to any one of the above described arrangement of magnetic elements. As shown, there are two rows 1422, 1424 of magnetic elements. Each of the two rows 1422, 1424 of magnetic elements can be arranged such that each magnetic element 1420 in a row has the same pole exposed on the exterior surface. In at least one embodiment, the magnetic elements 1420 can be arranged on a backing member 1410. The backing member 1410 can be made of a different material from the magnetic elements. In at least one embodiment, the backing member 1410 allows for magnetic flux to pass therethrough. Additionally, a magnetically inert spacer 1440 can be provided to space the first row from the second row. The magnetic flux lines 1430 are shown for illustrative purposes and can take other shapes.

Figure 15:
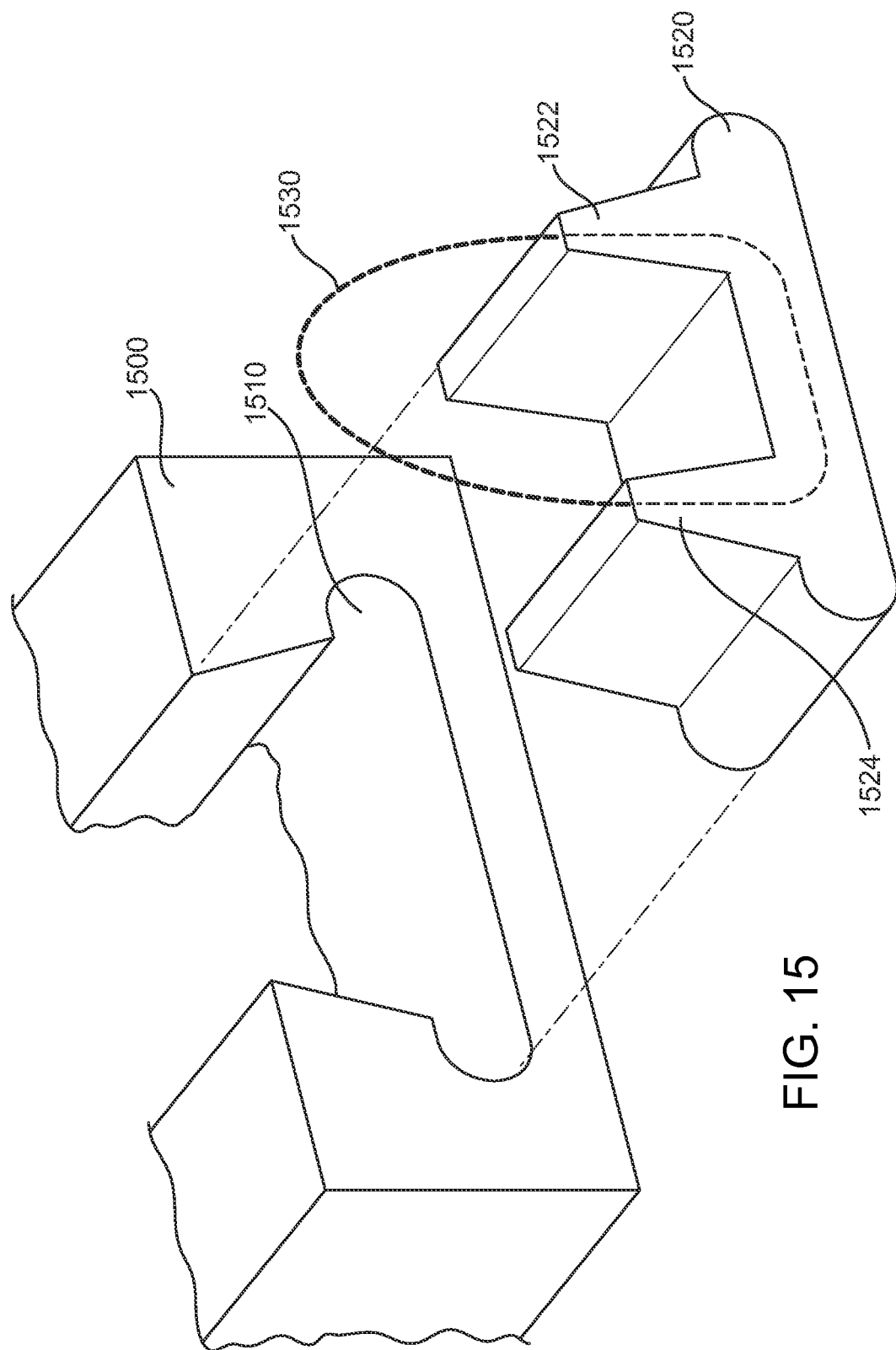
FIG. 15 is an exemplary pi magnetic arrangement, which can be incorporated as a magnet in one or more of the arrangements as presented herein.

FIG. 15 is an exemplary pi magnetic arrangement for cooperation with one of the drive generators 510 (shown in FIG. 5) as presented herein. The pi magnetic element 1520 is designed to fit within a slot 1510 formed in block 1500. The slot 1510 can be shaped to allow for removal of the pi magnetic element 1520. The pi magnetic element 1520 has two protruding members 1522 and 1524 each of the protruding members 1522, 1524 can have a different pole assorted therewith. The pi magnetic element arrangement as presented in FIG. 15 can be implemented with any of the above arrangements requiring magnetic elements.

As indicated herein, the present disclosure contemplates the use of controllers. The controllers can implement one or more processors capable of executing instructions that are stored on media. Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply not only to a transport system but can implement one or more of the components of the technology with other systems. Those skilled in the art will readily recognize various modifications and changes that may be made to the principles described herein without following the example embodiments and applications illustrated and described herein, and without departing from the scope of the disclosure.

What is claimed is:

1. A transport apparatus, comprising:
   at least one drive generator configured to generate a rotational magnetic force with at least one drive member of a track; and
   at least one levitation generator configured to generate a levitating magnetic force with at least one lifting member of the track and adjust an angle between a long axis of the at least one levitation generator and a direction velocity vector representing a direction of motion of the transport apparatus relative to the at least one lifting member.

2. The transport apparatus as recited in claim 1, further comprising at least one energy storage device coupled to the at least one drive generator or the at least one levitation generator.

3. The transport apparatus as recited in claim 1, further comprising at least one wheel that contacts a portion of the track when the levitating magnetic force is below a threshold.

4. The transport apparatus as recited in claim 1, wherein a magnitude of the levitating magnetic force corresponds to a relative velocity between the at least one levitation generator and the at least one lifting member.

5. The transport apparatus as recited in claim 1, wherein a magnitude of the levitating magnetic force is independent of a position of the at least one levitation generator relative to the at least one lifting member.

6. The transport apparatus as recited in claim 1, wherein the at least one levitation generator includes at least one elongate magnetic pole.

7. The transport apparatus as recited in claim 6, wherein the angle is a predetermined angle based on a magnetic force versus normal velocity constant KFN, a relative velocity between the at least one levitation generator and the at least one lifting member, and a specified lifting force.

8. The transport apparatus as recited in claim 6, wherein the angle is a variable angle based on a magnetic force versus normal velocity constant KFN, a relative velocity between the at least one levitation generator and the at least one lifting member, and a specified lifting force.

9. The transport apparatus as recited in claim 6, wherein a magnitude of the levitating magnetic force corresponds to a length of the at least one elongate magnetic pole relative to a width and a height of the at least one elongate magnetic pole such that the magnitude increases as the length increases relative to the width and the height.

10. The transport apparatus as recited in claim 6, wherein a magnitude of the levitating magnetic force corresponds to a relative velocity between the at least one elongate magnetic pole and the at least one lifting member such that the magnitude increases as the relative velocity increases.

11. The transport apparatus as recited in claim 10, wherein the at least one levitation generator is coupled to at least one second levitation generator via at least one articulation joint.

12. The transport apparatus as recited in claim 11, wherein the at least one levitation generator generates an electrical eddy current with at least a portion of the at least one lifting member when the at least one levitation generator moves relative to the at least one lifting member, and wherein a rate of the electrical eddy current corresponds to the angle between the long axis of the at least one levitation generator and the direction velocity vector.

13. The transport apparatus as recited in claim 12, wherein the rate of the electrical eddy current further corresponds to a degree of articulation of the at least one articulation joint.

14. The transport apparatus as recited in claim 6, wherein rotation of the at least one drive generator generates an electrical eddy current with the at least one drive member.

15. A track segment, comprising:
   at least one drive member configured to generate a rotational magnetic force with at least one drive generator of a transport apparatus; and
   at least one lifting member configured to generate a levitating magnetic force with at least one levitation generator of the transport apparatus and to accommodate the at least one levitation generator at multiple angles between a long axis of the at least one levitation generator and a direction velocity vector representing a direction of motion of the transport apparatus relative to the at least one lifting member.

16. The track segment as recited in claim 15, wherein the at least one drive member comprises an electrical armature with substantially helically wound polyphase electrical conductors.

17. The track segment as recited in claim 16, wherein the electrical armature is supplied with electrical currents to generate the rotational magnetic force with the at least one drive generator.

18. The track segment as recited in claim 16, wherein the electrical armature is supplied with electrical currents to generate a linear force with the at least one drive generator.

19. A transport system, comprising:
   a transport apparatus, comprising:
      at least one drive generator configured to generate a rotational magnetic force with at least one drive member of a track; and
      at least one levitation generator configured to generate a levitating magnetic force with at least one lifting member of the track and adjust an angle between a long axis of the at least one levitation generator and a direction velocity vector representing a direction of motion of the transport apparatus relative to the at least one lifting member; and
   the track, comprising:
      the at least one drive member configured to generate the rotational magnetic force with the at least one drive generator; and
      the at least one lifting member configured to generate the levitating magnetic force with the at least one lifting member and to accommodate the at least one levitation generator at multiple angles between the long axis of the at least one levitation generator and the direction velocity vector.

* * * * *